(12) United States Patent
Lings et al.

(10) Patent No.: US 8,885,934 B2
(45) Date of Patent: Nov. 11, 2014

(54) METHOD AND SYSTEM FOR DETERMINING COLOUR FROM AN IMAGE

(75) Inventors: Benjamin Buchanan Lings, Abingdon (GB); Paul James Harrop, Abingdon (GB); Peter Mark Spiers, Middlesex (GB); Steward Longhurst, Kidlington (GB)

(73) Assignee: Akzo Nobel Coatings International B.V., Arenhem (NL)

( * ) Notice: Subject to any disclaimer, the term of this patent is extended or adjusted under 35 U.S.C. 154(b) by 0 days.

(21) Appl. No.: 13/521,838

(22) PCT Filed: Jan. 17, 2011

(86) PCT No.: PCT/EP2011/050532
§ 371 (c)(1),
(2), (4) Date: Jul. 12, 2012

(87) PCT Pub. No.: WO2011/089093
PCT Pub. Date: Jul. 28, 2011

(65) Prior Publication Data
US 2013/0136349 A1 May 30, 2013

(30) Foreign Application Priority Data
Jan. 19, 2010 (GB) .................................. 1000835.7

(51) Int. Cl.
G06K 9/00 (2006.01)
G06K 9/62 (2006.01)
G01J 3/52 (2006.01)
G01J 3/02 (2006.01)
G01J 3/46 (2006.01)
H04N 1/60 (2006.01)

(52) U.S. Cl.
CPC ............... *G06K 9/6201* (2013.01); *G01J 3/524* (2013.01); *G01J 3/0264* (2013.01); *G01J 3/52* (2013.01); *G01J 3/463* (2013.01); *H04N 1/6033* (2013.01); *G01J 3/46* (2013.01)
USPC ........................... 382/165; 382/162; 382/167

(58) Field of Classification Search
USPC ............... 382/165, 162, 167; 250/226, 208.1; 348/65, 66; 356/402, 422; 358/501, 1.9
See application file for complete search history.

(56) References Cited

U.S. PATENT DOCUMENTS 5,150,199 A 9/1992 Shoemaker et al.
6,211,973 B1 4/2001 Takemoto
(Continued)

FOREIGN PATENT DOCUMENTS

WO 01/25737 A1 4/2001
WO 02/13136 A1 2/2002
(Continued)

OTHER PUBLICATIONS
International Preliminary Report on Patentability for PCT/EP2011/050533 issued on Jul. 24, 2012.
(Continued)

*Primary Examiner* — Anh Do
(74) *Attorney, Agent, or Firm* — Kenyon & Kenyon LLP

(57) ABSTRACT

Embodiments of the invention relate to the determination of the color of a color sample from an image of the color sample. In one embodiment a color sample capture card is provided having printed thereon color samples of known color (for example, XYZ tri-stimulus values). An image of the test color sample is then captured using domestically available equipment, such as a consumer digital camera or camera-equipped mobile telephone, the image also containing the color sample capture card. In one embodiment the image is then transmitted to a remote color determination service for color sample color determination. Regression analysis is then performed using the RGB color samples in the image and known XYZ colors thereof to characterize the color capture response of the image capture device. Having characterized the image capture device the XYZ color of the unknown color sample can be determined from the RGB color thereof in the image. Knowing the XYZ color, the color can then be matched to a palette of paint colors, to determine a paint color to match the unknown color.

47 Claims, 14 Drawing Sheets

(56) References Cited

U.S. PATENT DOCUMENTS

| | | | |
|---|---|---|---|
| 6,271,920 B1 * | 8/2001 | Macfarlane et al. | 356/402 |
| 6,404,517 B1 | 6/2002 | Chao | |
| 6,768,814 B1 | 7/2004 | Spritzer et al. | |
| 7,084,881 B1 | 8/2006 | Chen et al. | |
| 7,193,632 B2 | 3/2007 | Rice et al. | |
| 7,227,673 B2 * | 6/2007 | Gudaitis | 358/501 |
| 8,139,852 B2 | 3/2012 | Shinjo et al. | |
| 2002/0149770 A1 | 10/2002 | Kubo et al. | |
| 2003/0012428 A1 | 1/2003 | Syeda-Mahmood | |
| 2004/0032588 A1 | 2/2004 | Taylor et al. | |
| 2004/0179101 A1 | 9/2004 | Bodnar et al. | |
| 2005/0207644 A1 | 9/2005 | Kitagawara et al. | |
| 2006/0139665 A1 | 6/2006 | Clark | |
| 2006/0181707 A1 | 8/2006 | Gibson et al. | |
| 2006/0210153 A1 | 9/2006 | Sara et al. | |
| 2007/0058858 A1 | 3/2007 | Harville et al. | |
| 2007/0071314 A1 | 3/2007 | Bhatti et al. | |
| 2007/0242877 A1 | 10/2007 | Peters et al. | |
| 2012/0236308 A1 | 9/2012 | Satoh | |
| 2013/0182256 A1 | 7/2013 | Kubota et al. | |

FOREIGN PATENT DOCUMENTS

| | | |
|---|---|---|
| WO | 2004/028144 A1 | 4/2004 |
| WO | 2008/108763 A1 | 9/2008 |

OTHER PUBLICATIONS

International Preliminary Report on Patentability for PCT/EP2011/050534 issued on Jul. 24, 2012.

International Preliminary Report on Patentability for PCT/EP2011/050535 issued on Jul. 24, 2012.

International Search Report and Written Opinion of the International Searching Authority for PCT/EP2011/050532 mailed on Jun. 9, 2011.

International Search Report and Written Opinion of the International Searching Authority for PCT/EP2011/050533 mailed on Apr. 21, 2011.

International Search Report and Written Opinion of the International Searching Authority for PCT/EP2011/050534 mailed on Apr. 15, 2011.

International Search Report and Written Opinion of the International Searching Authority for PCT/EP2011/050535 mailed on Apr. 6, 2011.

InCamera 4.0 User Guide—5. "Creating the Profile: Adjusting the Grid", PictoColor Corporation, Sep. 19, 2007, retrieved from the Internet: URL:http://www.pictocolor.com/UserGuides/1nCameraUGWin.pdf.

B. Fraser et al., "Real world color management, Chapter 7: Building Input Profiles", Real World Color Management: Industrial Strength Production Techniques, XP00260656, Jan. 1, 2003.

Seok-Han Lee et al., "Color Correction System Using a Color Compensation Chart for the Images from Digital Camera", Advances in Image and Video Technology Lecture Notes in Computer Science, Jan. 1, 2006, pp. 258-269.

* cited by examiner

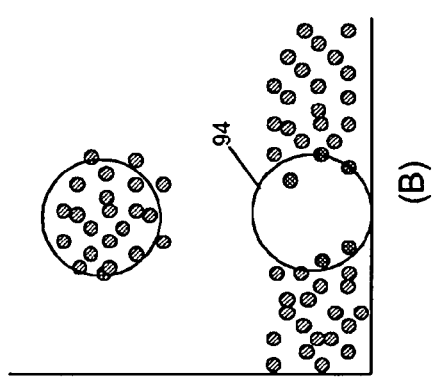
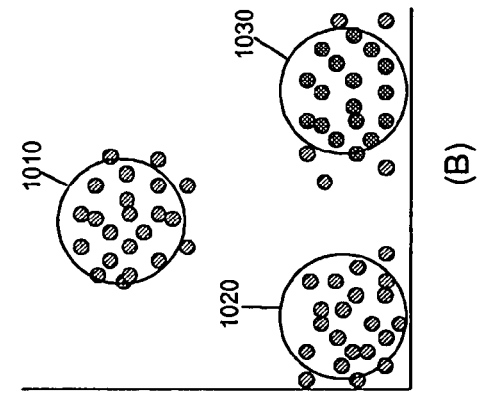
FIGURE 9
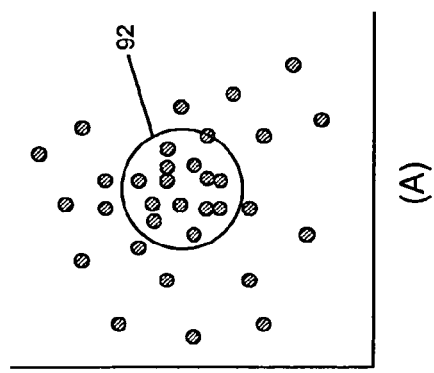
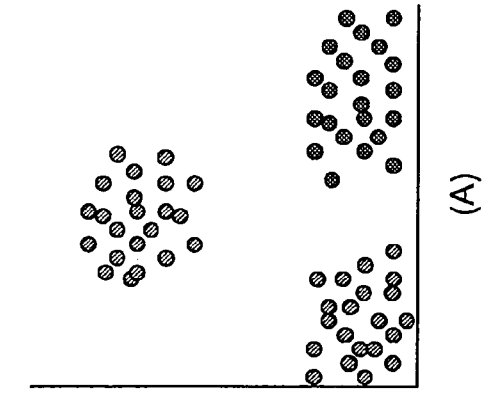
FIGURE 10

METHOD AND SYSTEM FOR DETERMINING COLOUR FROM AN IMAGE

REFERENCE TO RELATED APPLICATIONS

This application is the U.S. National Phase of PCT/EP2011/050532 filed on Jan. 17, 2011, and claims the benefit of GB Application No. 1000835.7, filed on Jan. 19, 2010.

TECHNICAL FIELD

Embodiments of the invention relate to a method and system for determining the colour of a colour sample from an image of the colour sample.

BACKGROUND TO EXAMPLES OF THE INVENTION

When selecting a paint colour for decorating a room, it is often the case that the customer will wish to match the paint colour to a colour of a particular item to be contained in the room such as an item of furniture, or soft furnishings such as cushions, sofas, curtains, or the like. Paint producers typically provide large colour palettes, and detailed colour displays are provided in paint retailers, to enable customers to select a colour. Colour sample cards are available for the user to take home and match to the item to which the colour is to be matched. However, conventionally this requires the customer to visit a paint retailer store, collect colour cards, take the colour cards home, and then attempt to compare the colour samples on the colour cards with the colour of the item to be matched. The customer must then return to the store, typically buy tester pots of paint, return home, use the tester pots of paint, and then ultimately make a purchasing decision. In addition, such conventional techniques rely upon the individual customer's perception as to which is the best matching paint colour. However, it is well known that colour perception varies significantly from person to person, such that a matching colour to a sample selected by one person will not appear to be a matching colour to another person.

One potential solution to this problem is to try and match colours electronically, using a digital image. In this regard, nowadays domestic users typically have many digital image capture devices at their disposal, in the form of digital cameras, or camera equipped mobile telephones.

However, the colour capture characteristics of typical domestically available image capture devices, such as digital cameras, mobile telephones or the like, vary significantly from device to device and hence accurate colour capture is not typically possible. Specialist spectrophotometer devices are available that can accurately measure colour, but these are beyond the means of most domestic consumers. Typical domestic image capture devices will capture an image and represent colour using RGB pixel values. Typically 16 bit or 24 bit RGB is used. Where 16 bit values are used, each of the red and blue channels typically has five bits associated therewith, whereas the green channel has six bits associated therewith. In this respect, the human eye is more sensitive to green colours than it is to red and blue colours, and hence a greater number of green colours are detectable. Where 24 bit colour is used, then this equates to eight bits, or 256 colours, per colour channel.

However, because of the above noted differences in image capture devices in capturing colour accurately, and also in image reproduction devices such as monitors and the like in reproducing colours, RGB values of colour are not regarded as standard values. Instead, there are fixed standards defining colour laid down by the Commission International De L'Eclairage (CIE) such as the CIE tristimulus values X, Y, Z, or the so-called CIELAB values (L*, a*, b*). CIELAB values are related to the tristimulus values XYZ using a known mathematical formula. The tristimulus XYZ values are themselves related to the wavelengths present in a particular colour.

PRIOR ART

The issue of calibrating an image capture device by relating RGB values captured thereby to standard values such as XYZ tristimulus values, or CIELAB values, has been addressed previously, in U.S. Pat. No. 5,150,199, and WO01/25737.

More particularly, U.S. Pat. No. 5,150,199 (Megatronics, Inc.) describes a method for converting or correlating numerical RGB values developed by different instruments into standard tristimulus values. In this regard, iterative regression analysis is used to determine initial functions which convert RGB values generated by a video camera from initial colours to standard XYZ tristimulus values. Regression analysis is then used to determine additional functions which convert RGB values generated by the video camera viewing additional colours different than the initial colours to standard XYZ values. The functions generated for the video camera are then used to convert RGB values generated by the video camera in imaging a coloured object to standard XYZ values.

More particularly, within U.S. Pat. No. 5,150,199 both RGB values and XYZ values are determined from a set of colour samples. The RGB values are determined using a conventional video camera and digitizing equipment capable of detecting and recording numeric values for the RGB components of each colour. XYZ values of the colour samples are determined by the use of a conventional colorimeter or spectrophotometer.

Having captured this data, as a first step in the analysis iterated regression analysis is performed to find X is a function of R, Y as a function of G, and Z as a function of B. This regression analysis uses so-called "greyscale" values in the colour samples, where R, G and B values are approximately equal. The resulting functions are power functions. Thereafter, in step 2, multivariate analysis of the power functions is performed, determining functions that relate each of X, Y and Z individually to all of R, G and B. Within U.S. Pat. No. 5,150,199, a further technique which adapts the Y function as a function of red chroma is also described, although it is not pertinent herein.

Thus, U.S. Pat. No. 5,150,199 describes a basic technique for characterising the colour capture transfer function of an image capture device, in order to allow RGB values captured by the device to be translated to XYZ tristimulus values. However, as noted, in order to use the arrangement of U.S. Pat. No. 5,150,199, in order to characterise an image captured the user must have access to a colorimeter or spectrophotometer in order to measure the colour of the colour samples which are also being imaged by the image capture device being characterised. Typically, in the use scenario outlined in the background portion above, a user will not have access to such specialist equipment such as a colorimeter or a spectrophotometer. Hence, the method of U.S. Pat. No. 5,150,199 is largely experimental.

However, WO01/25737 partially addresses these drawbacks of U.S. Pat. No. 5,150,199. WO01/25737 also describes matching captured RGB values to standard colorimetric data, and in particular matching to CIELAB values. The mathematical analysis described in WO01/25737 is substantially the same as that described in U.S. Pat. No. 5,150, 199, although WO01/25737 introduces the concept of a calibration pattern of known colours, the colorimetric data for which it is known. The unknown colour to be measured is then imaged at the same time as the calibration pattern. The calibration pattern contains in one example 65 known colours and in another example, 37 known colours distributed over the colour space. By capturing RGB values of the calibration colours it is possible to calculate the mathematical model needed in order to convert the measured signals of the known colours to colorimetric data (e.g. CIELab values). Once this model is obtained, then the colours (in CIELab colour space) of any unknown colours in the image can then be determined from the RGB values thereof.

WO01/25737 describes that the image of the colour sample to be determined is captured at the same time as that of the calibration pattern using for example a flatbed scanner, or digital camera. The captured image is then processed to determine the unknown colours in the image. The arrangement is described as being particularly useful in the car repair industry. In this respect, the colour of a car to be repaired is measured using an electronic imaging device. Prior to this or at the same time a recording is made of a panel on which different calibration colours have been applied. The colorimetric data of a car's colour is then calculated and then a colour formula which will give a colour identical to the colour of the car to be repaired is found. The colour formula is prepared in a dispenser, and then applied.

WO01/25737 therefore describes an arrangement to be used in professional situations, such as car repair or paint shops. As such, WO01/25737 does not address at all problems relating to issues such as where lighting varies across the captured image, where the image is not in the correct orientation, or where the colour sample in fact contains different colours spatially mixed up across the sample. In contrast, in a domestic situation, all of these anomalous situations can occur.

Other prior art to the invention includes WO02/13136, WO2008/108763, and WO2004/028144.

SUMMARY OF EXAMPLES OF THE INVENTION

Embodiments of the invention address some of the above noted issues, and relate to the determination of the colour of a colour sample from an image of the colour sample, the image having been typically (although not exclusively) captured by an unskilled user using non-specialist equipment. In one embodiment a colour sample capture card is provided having printed thereon colour samples of known colour (for example, XYZ tri-stimulus values). An image of the test colour sample is then captured using domestically available equipment, such as a consumer digital camera or camera-equipped mobile telephone, the image also containing the colour sample capture card. In one embodiment the image is then transmitted to a remote colour determination service for colour sample colour determination. Regression analysis is performed using the RGB colour samples in the image and known XYZ colours thereof to characterise the colour capture response of the image capture device. Having characterised the image capture device the XYZ colour of the unknown colour sample can be determined from the RGB colour thereof in the image. Knowing the XYZ colour, the colour can then be accurately matched to a palette of paint colours, to determine a paint colour to match the unknown colour. In addition, complementary colours in the paint palette may be identified.

In performing the above, in one embodiment differences in spatial brightness across the image can be accounted for. In another embodiment card placement errors in the image are also corrected prior to processing, using image de-skewing and rotational transformations. In a further embodiment the XYZ colour is calculated in two passes, using information from the first pass to inform the second pass. In a yet further embodiment, where the colour sample in fact contains more than one colour, the individual colours are determined using clustering techniques, to identify the dominant colours in the sample.

In view of the above, a first aspect of the invention provides a method, comprising: receiving first image data relating to an unknown colour sample, colorimetry data for which is to be determined; and receiving second image data relating to a plurality of known calibration colour samples, colorimetry data for which are already known. A plurality of colour calibration characteristics relating colour measurements of the known calibration colour samples from the second image data to the corresponding known colorimetry data of the calibration colour samples are then determined; and colorimetry data of the unknown colour sample is calculated in dependence on colour measurements thereof from the first image data and the determined colour calibration characteristics. The determined colorimetry data of the unknown colour sample may then be matched to a colour palette of paint colours to identify a matching paint colour, and information relating to the matching paint colour provided to the user.

In one embodiment, the first image data and second image data is received from a remote user via a telecommunications network. In addition, the information relating to the matching paint colour is provided to the user via the telecommunications network. In this way matching paint colours to an unknown colour sample can be provided using a remote service.

In an embodiment the first image data and second image data is received as any of: i) an email message; ii) an MMS message; and/or iii) as image data in a web page. In addition, the information relating to the matching paint colour may also be provided as any of i) an email message; ii) an MMS message; iii) an SMS message and/or iv) data in a web page. Such communications protocols facilitate the provision of a paint matching service remotely, being familiar to users, and easy to use.

In one embodiment the first image data and the second image data is produced by the user using an image capture device; wherein the image capture device is preferably any of: i) a digital camera; ii) a camera equipped mobile telephone; and/or iii) a digital camcorder. Again, such equipment is readily to hand to a typical user, and the user is familiar with the operation of such equipment.

In one embodiment the determined colorimetry data and/or the known colorimetry data are XYZ tri-stimulus values. XYZ tri-stimulus values define fixed and specific standardised colours.

In one embodiment complementary colours to the matching colour may be determined, and information relating to the determined complementary colours provided to the user. By providing complementary colours then colour schemes can be more readily determined.

In one embodiment at least the second image data is oriented into a known orientation to allow for recognition of the known calibration colour samples therein. Automatic orientation of the image data allows for ease of use for the end user, as the captured second image data need not be captured in any specific required orientation.

In this embodiment the orienting preferably comprises performing edge detection to identify the location of the set of known calibration colour samples in the second image data. In addition, the orienting may further comprise identifying a plurality of pre-determined points relating to the set of known calibration colour samples in the second image data. Once these known points are identified a perspective transformation can be applied to the second image data in dependence on the location of the identified points to de-skew the image of the set of known calibration colour samples.

Moreover, in this embodiment the orienting may further comprise identifying pre-determined rotational orientation markings relating to the set of known calibration colour samples in the second image data. The second image data may then be rotated in dependence on the location of the identified rotational orientation marks such that the known calibration colour samples are placed into a known position in the second image data.

In one embodiment brightness differences across the set of known calibration colour samples may also be compensated. This allows the image data to be captured in uncontrolled lighting conditions, where there may be unequal lighting across the image. Again, this allows for ease of use for the end-user.

Within this embodiment the compensating may comprise determining a first set of one or more functions having a first set of calibration coefficients, the one or more functions relating measured colours of the known calibration colour samples from the second image data to the known colorimetry data of the calibration colour samples and the known position of each known sample in the image. The determined functions are then analysed to find a second set of functions having a second set of calibration coefficients. The first and second sets of functions and calibration coefficients are then used in calculating the colorimetry data of the unknown colour sample.

In this embodiment the analysing may comprise calculating intermediate colour values for substantially each known calibration colour sample, and then using the calculated intermediate colour values to determine the second set of functions having the second set of calibration coefficients.

More specifically, the calculated intermediate colour values are subject to a multi-variate fit to determine the second set of functions having a second set of calibration coefficients. Preferably the multi-variate fit is of the form:

$$\begin{pmatrix} X_i \\ Y_i \\ Z_i \end{pmatrix} = \begin{pmatrix} a_X \\ a_Y \\ a_Z \end{pmatrix} + \begin{pmatrix} b_X & c_X & d_X \\ b_Y & c_Y & d_Y \\ b_Z & c_Z & d_Z \end{pmatrix} \begin{pmatrix} X'_i \\ Y'_i \\ Z'_i \end{pmatrix}.$$

In addition, more preferably the brightness compensating further comprises, prior to the determination of the first set of functions, determining a pre-cursor set of functions having a pre-cursor set of calibration coefficients that relate measured colours of the known calibration colour samples from the second image data to the known colorimetry data of the calibration colour samples without taking into account position of the known colour samples. The pre-cursor set of calibration coefficients are then used as part of the first set of calibration coefficients in the determination of the first set of one or more functions. In one embodiment preferably the pre-cursor set of calibration coefficients are found using greyscale samples only.

In one embodiment the colour calibration characteristics are determined using N known calibration colour samples, wherein N is less than the total number of known calibration colour samples across the whole colour space. In some circumstances this can provide more accurate results.

More preferably, in the above embodiment the N known calibration colour samples are those N samples that are the closest in colour space to an estimated colour of the unknown colour sample. This effectively allows the colour space to be "zoomed in" when determining the colour calibration characteristics, so that the part of the colour space that contains the unknown colour sample is more accurately characterised.

Within the above embodiment the estimated colour may be obtained by determining a first set of calibration characteristics using all the available known calibration colour samples, and calculating the estimated colour using the first set of calibration characteristics. A "second pass" of processing is then performed, using the N nearest known calibration colour samples to the estimated colour. In this way, a two-pass processing approach is used, which allows the general colour space to be characterised, and then the part of the space containing the unknown the colour sample to be characterised in further detail, to provide more accurate results.

Alternatively, the N known calibration colour samples are those N samples used within a confined colour space that the second image data is known to represent. In this respect, it may be that the known calibration colour samples are known to be within a confined part of the colour space, for example, may all be reds, or blues. That is, if trying to match a red colour then the user uses known calibration colour samples that are predominantly reds, or close to reds, to thereby restrict the part of the colour space of the capturing device that needs characterisation.

In a further alternative the N known calibration colour samples are those N samples that have measured colour values from the second image data that are most similar to the measured colour value of the unknown sample from the first image data. For example, the N known calibration colour samples that have the closest RGB or sRGB values to the unknown colour sample may be used.

Within the above embodiments, N is preferably in a range of substantially 5 to substantially 250, or more preferably substantially 10 to substantially 100, or more preferably substantially 20 to substantially 85, or more preferably substantially 30 to substantially 70, or more preferably substantially 40 to substantially 60, or most preferably at or around 50. In other embodiments then different numbers or ranges of N may be used.

In an embodiment of the invention a clustering algorithm may be applied to pixel values of pixels representing the unknown colour sample in the first image to determine the number of colours in the sample image, and a colour, identified for each identified cluster. With such an arrangement, if the unknown colour sample contains more than one colour, then either the dominant colour can be identified, and/or the individual colours separately identified.

Within this embodiment the pixel values are first calibrated using the colour calibration characteristics. This has the effect of ensuring that the clustering algorithm is operating on the real colours in the colour sample. Preferably the pixel values are calibrated to determine L*a*b* or XYZ values for clustering.

The clustering algorithm in use may then operate by: i) calculating the mean value of pixels in a cluster; ii) then determining the number of pixels within a predetermined threshold distance of the mean value; and then iii) increasing the number of clusters if the determined number of pixels is less than a predetermined fraction of the number of pixels in the first image data relating to the unknown sample. In this way it becomes possible to identify different colours in the sample, with each identified cluster relating to a corresponding individual colour, and also to have confidence that enough pixels have been observed to identify the dominant colours.

Where there is more than one cluster, the determination of the number of pixels within the predetermined threshold distance of the mean value comprises summing the respective number of pixels within the predetermined threshold of each cluster, the number of clusters being increased if this sum is less than the predetermined fraction. Again this makes sure that enough pixels have been observed to have confidence that the dominant colours have been identified.

In order to ensure that dominant or important colours in the sample are detected, the embodiment may also filter clusters to remove those clusters from consideration that do not contain a threshold number of pixels within a second threshold distance of the mean of the cluster. Hence, colour clusters with only a small number of pixels are not identified as dominant or important colours in the sample.

The present specification also describes a method, comprising: receiving first image data relating to an unknown colour sample, colorimetry data for which is to be determined; receiving second image data relating to a plurality of known calibration colour samples, colorimetry data for which are already known; determining a plurality of colour calibration characteristics relating colour measurements of the known calibration colour samples from the second image data to the corresponding known colorimetry data of the calibration colour samples; and calculating colorimetry data of the unknown colour sample in dependence on colour measurements thereof from the first image data and the determined colour calibration characteristics; the method being characterised in further comprising orienting at least the second image data into a known orientation to allow for recognition of the known calibration colour samples therein.

The present specification also describes a method, comprising: receiving first image data relating to an unknown colour sample, colorimetry data for which is to be determined; receiving second image data relating to a plurality of known calibration colour samples, colorimetry data for which are already known; determining a plurality of colour calibration characteristics relating colour measurements of the known calibration colour samples from the second image data to the corresponding known colorimetry data of the calibration colour samples; and calculating colorimetry data of the unknown colour sample in dependence on colour measurements thereof from the first image data and the determined colour calibration characteristics; the method being characterised in further comprising compensating for brightness differences across the set of known calibration colour samples in the determination of the plurality of colour calibration characteristics.

The present specification also describes a method, comprising: receiving first image data relating to an unknown colour sample, colorimetry data for which is to be determined; receiving second image data relating to a plurality of known calibration colour samples, colorimetry data for which are already known; determining a plurality of colour calibration characteristics relating colour measurements of the known calibration colour samples from the second image data to the corresponding known colorimetry data of the calibration colour samples; and calculating colorimetry data of the unknown colour sample in dependence on colour measurements thereof from the first image data and the determined colour calibration characteristics; the method being characterised in that the colour calibration characteristics are determined using N known calibration colour samples, wherein N is less than the total number of known calibration colour samples across the whole colour space.

The present specification also describes a method, comprising: receiving first image data relating to an unknown colour sample, colorimetry data for which is to be determined; receiving second image data relating to a plurality of known calibration colour samples, colorimetry data for which are already known; determining a plurality of colour calibration characteristics relating colour measurements of the known calibration colour samples from the second image data to the corresponding known colorimetry data of the calibration colour samples; and calculating colorimetry data of the unknown colour sample in dependence on colour measurements thereof from the first image data and the determined colour calibration characteristics; the method being characterised by the calculating further comprising: applying a clustering algorithm to pixel values of pixels representing the unknown colour sample in the first image to determine the number of colours in the sample image; and returning a colour for each identified cluster.

From a second aspect of the invention there is also provided an apparatus, comprising: at least one processor; and at least one memory including computer program code the at least one memory and the computer program code configured to, with the at least one processor, cause the apparatus to perform at least the following: i) receive first image data relating to an unknown colour sample, colorimetry data for which is to be determined, and second image data relating to a plurality of known calibration colour samples, colorimetry data for which are already known: ii) determine a plurality of colour calibration characteristics relating colour measurements of the known calibration colour samples from the second image data to the corresponding known colorimetry data of the calibration colour samples; iii) calculate colorimetry data of the unknown colour sample in dependence on colour measurements thereof from the first image data and the determined colour calibration characteristics; iv) match the determined colorimetry data of the unknown colour sample to a colour palette of paint colours to identify a matching paint colour, and v) provide information relating to the matching paint colour to a user.

The present specification also describes a system, comprising: a data receiver that in use receives first image data relating to an unknown colour sample, colorimetry data for which is to be determined, and second image data relating to a plurality of known calibration colour samples, colorimetry data for which are already known; a processor that in use: i) determines a plurality of colour calibration characteristics relating colour measurements of the known calibration colour samples from the second image data to the corresponding known colorimetry data of the calibration colour samples; and ii) calculates colorimetry data of the unknown colour sample in dependence on colour measurements thereof from the first image data and the determined colour calibration characteristics; wherein the first image data and second image data is received from a remote user via a telecommunications network.

The present specification also describes a system, comprising: a data receiver that in use receives first image data relating to an unknown colour sample, colorimetry data for which is to be determined, and second image data relating to a plurality of known calibration colour samples, colorimetry data for which are already known; a processor that in use: i) determines a plurality of colour calibration characteristics relating colour measurements of the known calibration colour samples from the second image data to the corresponding known colorimetry data of the calibration colour samples; and ii) calculates colorimetry data of the unknown colour sample in dependence on colour measurements thereof from the first image data and the determined colour calibration characteristics; the system being characterised in that the processor is further arranged to orient at least the second image data into a known orientation to allow for recognition of the known calibration colour samples therein.

The present specification also describes a system, comprising: a data receiver that in use receives first image data relating to an unknown colour sample, colorimetry data for which is to be determined, and second image data relating to a plurality of known calibration colour samples, colorimetry data for which are already known; a processor that in use: i) determines a plurality of colour calibration characteristics relating colour measurements of the known calibration colour samples from the second image data to the corresponding known colorimetry data of the calibration colour samples; and ii) calculates colorimetry data of the unknown colour sample in dependence on colour measurements thereof from the first image data and the determined colour calibration characteristics; the system being characterised by the processor further being arranged in to compensate for brightness differences across the set of known calibration colour samples in the determination of the plurality of colour calibration characteristics.

The present specification also describes a system, comprising: a data receiver that in use receives first image data relating to an unknown colour sample, colorimetry data for which is to be determined, and second image data relating to a plurality of known calibration colour samples, colorimetry data for which are already known; a processor that in use: i) determines a plurality of colour calibration characteristics relating colour measurements of the known calibration colour samples from the second image data to the corresponding known colorimetry data of the calibration colour samples; and ii) calculates colorimetry data of the unknown colour sample in dependence on colour measurements thereof from the first image data and the determined colour calibration characteristics; the system being characterised in that the colour calibration characteristics are determined using N known calibration colour samples, wherein N is less than the total number of known calibration colour samples across the whole colour space.

The present specification also describes a system, comprising: a data receiver that in use receives first image data relating to an unknown colour sample, colorimetry data for which is to be determined, and second image data relating to a plurality of known calibration colour samples, colorimetry data for which are already known; a processor that in use: i) determines a plurality of colour calibration characteristics relating colour measurements of the known calibration colour samples from the second image data to the corresponding known colorimetry data of the calibration colour samples; and ii) calculates colorimetry data of the unknown colour sample in dependence on colour measurements thereof from the first image data and the determined colour calibration characteristics; the system being characterised by the processor being further arranged in use to: apply a clustering algorithm to pixel values of pixels representing the unknown colour sample in the first image to determine the number of colours in the sample image; and return a colour for each identified cluster.

Further aspects and features of the present invention will be apparent from the appended claims.

BRIEF DESCRIPTION OF THE DRAWINGS

Further features and advantages of examples of the invention will become apparent from the following description of specific embodiments of the invention, presented by way of example only, and by reference to the accompanying drawings, wherein like reference numerals refer to like parts, and wherein:—

FIG. 9 is a diagram demonstrating use of the clustering process used in an embodiment of the invention;

FIG. 10 is another diagram illustrating use of the clustering process used in an embodiment of the invention;

DESCRIPTION OF SPECIFIC EMBODIMENTS

Various examples of the invention will now be described with respect to the accompanying figures.

1. First Embodiment

Remote Determination of Colour

Figure 1:
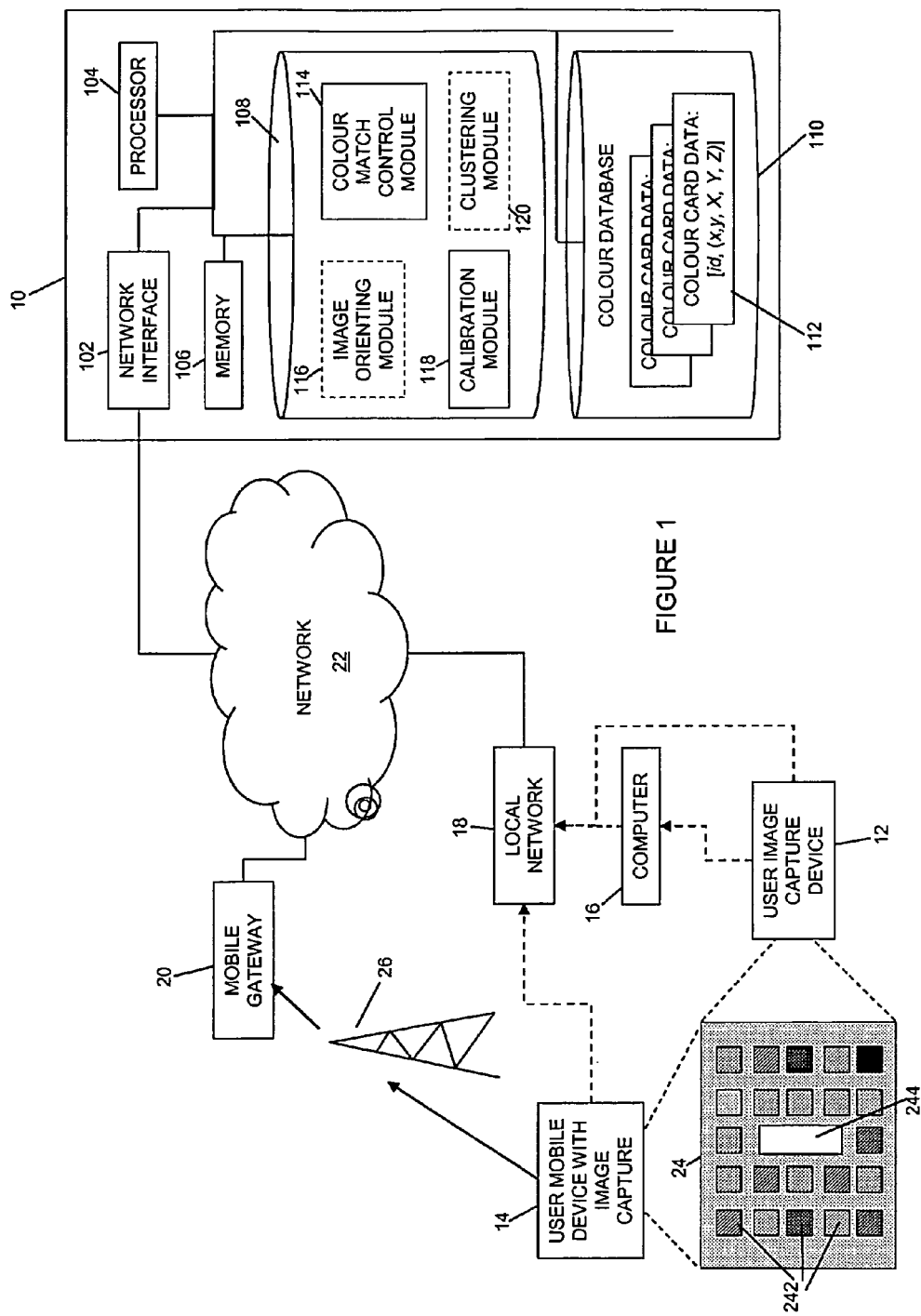
FIG. 1 is a block diagram of a system according to an embodiment of the invention.

FIG. 1 is a block diagram of a system according to a first embodiment of the present invention. The system has user-side elements and back-end server-side elements. The user-side elements are used to capture an image of the colour sample to be determined, together with an image of calibration colour samples, the colorimetric data of which is known. The server side or back-end elements relate to processing elements which receive the image data, process the image data, determine the colour of the unknown sample colour, match the colour to a paint palette and then return the matched colour from the palette to the user.

In this regard, the first embodiment of the present invention is aimed at providing a system which allows a domestic customer, or other user, to identify accurately the colour of an unknown colour sample. In order to perform this, the user obtains a calibration colour sample card, for example by post, or by visiting a paint retail store where they are available. The calibration colour sample card has a cut out portion into which an object the colour of which is to be determined can be placed. The user then captures an image of the calibration colour sample card, with the object the colour of which is to be determined in the cut out portion, using readily available image capture devices, such as a digital camera or a camera equipped mobile phone. The image is then transmitted by the user, for example by email, multimedia messaging service (MMS), or using a web interface, to the back-end server where it is processed, the colour of the unknown colour sample is determined, and information passed back to the user regarding a matching paint colour. In addition, information regarding complementary paint colours so as to make up a paint colour scheme may also be passed back to the user.

FIG. 1 illustrates the elements of such a system in more detail. Starting at the user end, the user obtains calibration colour sample card 24, for example from a local paint retailer, or sends off for it by post. The calibration colour sample card 24 has thereon a number of individual colour samples 242, spatially distributed across the card, the colours of the colour samples 242 also being distributed across the colour space. The calibration colour sample card 24 has a cut out portion 244, shown in FIG. 1 located in the middle, but which in other embodiments may be located anywhere on the card, into which, in use, an object to be sampled is placed, or the card is placed over the object to be sampled, so that part of the object to be sampled shows through the cut out portion 244. Further details of the calibration colour sample card 24 will be described later with respect to FIG. 2.

In use, as noted the user places the calibration colour sample card 24 over the object whose colour is to be determined. The user then uses an image capture device such as a digital camera, or a mobile phone provided with a camera, so as to take an image of the calibration colour sample card 24 with the unknown colour sample to be determined also located in the image. As shown in FIG. 1, a user image capture device 12 such as a digital camera may be used, or a user mobile device 14, equipped with an image capture device such as a built in camera.

Once the user has captured the image, the user must then transmit the image to the back end server 10 for image processing. Various different transmission technologies may be used to transmit the image data to the back end server 10, and embodiments of he invention are not limited to those described. For example, the user may load the captured image from the digital camera 12 onto his or her computer 16, the computer 16 being connected to the internet 22 via a local network, such as a WiFi router 18. Then, the user may use the computer 16 to send an email of the image as an attachment to an email address which relates to the back-end server 10.

Alternatively, the back end server 10, via a network interface, may provide a dedicated web page which can be downloaded by the computer 16 and displayed by a browser program, and into which the image data may be placed, so as to be sent back to the back end server 10.

An alternative route to the back end server is provided where the user uses a mobile phone to capture the image. Some mobile devices, often known as smartphones, have a WiFi functionality and can be used to send emails or access web pages in the same manner as a laptop or desktop computer. In this case the user mobile device is being used as a portable computer and the image captured thereby may be sent by email, or as data entered into a webpage, back to the back end server. Alternatively, the user mobile device may use its cellular radio interface to send the image data to the back-end server 10. In this case, the image data may be sent, for example as a multimedia messaging service (MMS) message via cellular network 26 to a mobile gateway 20, which then transmits the image data to the back end server 10. In this respect, a particular contact number may be provided and made known to the user (for example printed on the calibration colour sample card 24) to which MMS messages may be sent.

The back-end server 10 comprises a network interface 102 connected to network 22 for receiving image data from users, and transmitting colour matching data thereto, as will be described. The back-end server 10 further comprises a processor 104 running programs to perform the colour determination and generally control the operation of the back-end server 10. Working memory 106 is provided for use by the processor, into which data can be stored temporarily.

Also provided in the back-end server 10 is a computer readable medium 108 which forms long term storage in which data and programs can be stored. For example computer readable medium 108 may be a hard disc drive, or may, for example, be solid state storage. Stored on computer readable medium 108 are a number of control programs. In this first embodiment a colour match control module 104 is provided, which controls the overall operation of the system, and calls other modules to perform operations as and when required. Additionally provided in the first embodiment is a calibration module 118, which receives control commands from the colour match control module 114 as appropriate, and is run by the processor 104 so as to perform a calibration function, and in particular to perform the necessary regression analyses so as to be able to characterise the colour capture characteristics of the image capture device used by the user. Further details of the operation of calibration module 118 will be given later.

In other embodiments, additional modules may be provided, such as the image orienting module 116, or the clustering module 120. The operation of these additional modules will be described later, in respect of the pertinent embodiment.

Additionally provided in the back-end server 10 is a further computer readable storage medium 110, which may also take the form of a hard disk, solid state storage or the like. In this respect, the second computer readable storage medium 110 may in fact be the same medium as medium 108, and may be, for example, a partition of the same hard disk that constitutes first computer readable storage medium 108. The second computer storage medium 110, however, stores a colour database comprising colorimetry data relating to the colour samples on the calibration colour sample card 24. Several sets of such data may be stored, relating to different calibration colour sample cards 24 that may be available. For each calibration colour sample card 24, the ID of the card is stored, and then for each known colour sample on the card, the known XYZ tristimulus values are stored, together with the location co-ordinates x, y, of the colour sample having those tristimulus values on the card. There will therefore be as many sets of co-ordinate values and associated tristimulus values as there are colour sample patches on the calibration colour sample card 24.

Figure 2:
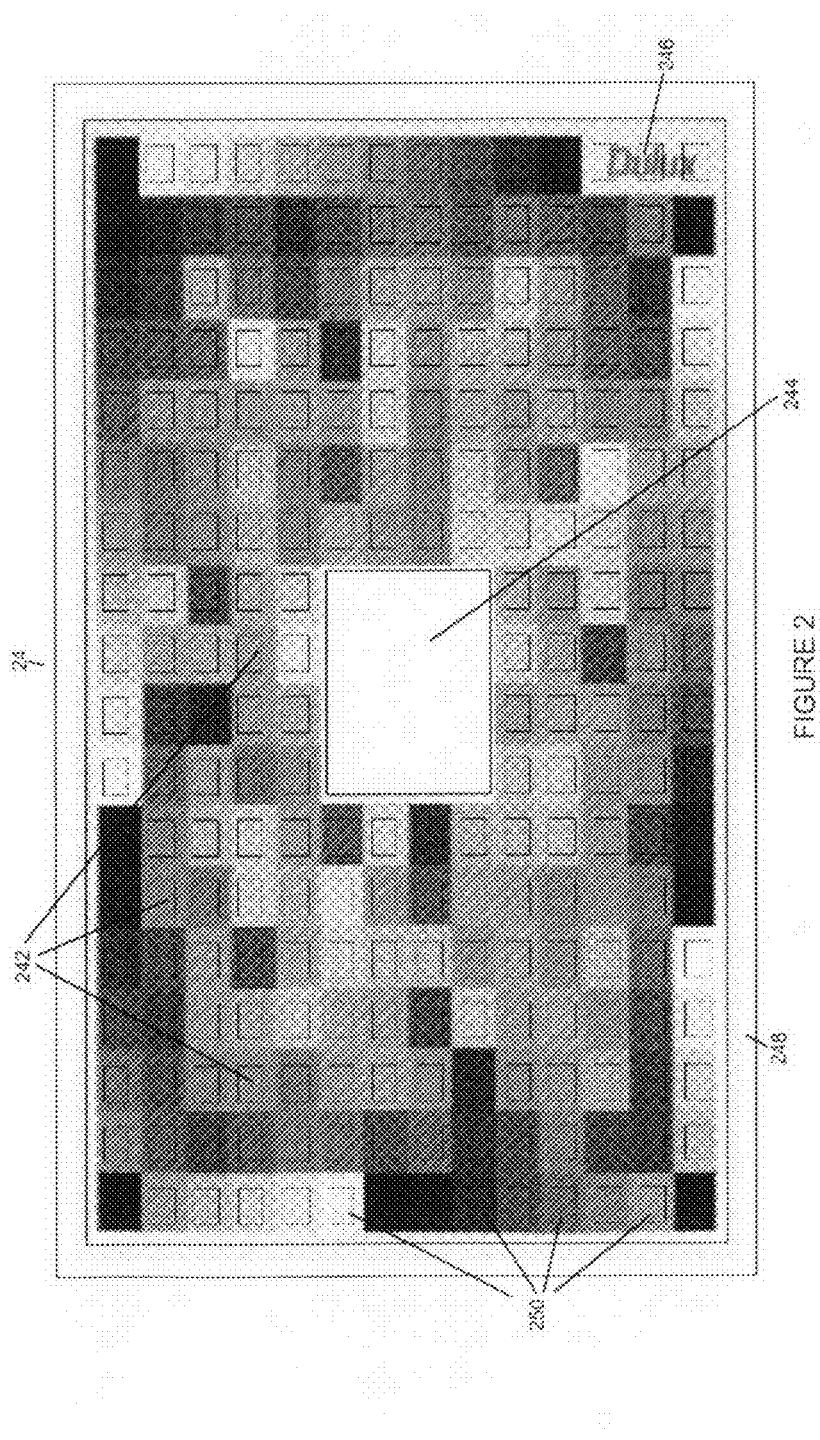
FIG. 2 is a drawing of a colour calibration sample card used in an embodiment of the invention.

FIG. 2 illustrates the calibration colour card sample 24 in more detail. In particular, the calibration colour sample card 24 has a border 248 at an outer edge thereof, and then has printed thereon colour sample patches of known colour. The colour sample patches are arranged such that the patches 250 around the outer edge of the colour sample patch region are greyscale patches i.e. they range from black through various greyscale colours to white. These should be captured by an image capture device such as a digital camera with substantially equal RGB values. They are useful in performing spatial brightness correction, as will be described in a later embodiment.

The colour sample patches 242 located further in from the edges of the calibration colour sample card 24 are colour patches, each of which is of a known tristimulus colour value. In this respect, the colour patches must be printed as accurately as possible to the tristimulus values desired. Alternatively, the calibration colour cards can be printed, and then each patch measured so as to determine its XYZ values, using, for example, a spectrophotometer. The colours of the colour sample patches 242 are preferably distributed across the whole colour space. However, in other embodiments to be described later, the colours may be concentrated within a particular area of the colour space.

The card 24 is also provided with some sort of identifying mark 246, which may be a barcode, or some other fiducial mark, such as a printed name, symbol or the like. This is used to identify which card is being used by the user, such that the correct colour card data can be selected for use.

Finally, the calibration card 24 has a cut out portion 244, here shown in the middle. However, the position of the cut out portion is not important, and it can be located anywhere on the card and even at the edges. It is moreover not essential that a cut out portion be included; in this respect, the calibration colour sample card 24 could simply be placed next to an object or sample the colour of which is to be determined, although this is less preferable.

In use, as noted, the user obtains the calibration colour sample card 24, for example from a paint retailer, and then places the calibration card 24 such that the cut out portion is over a colour to be sampled, for example, the colour of a cushion, curtain, item of furniture, or the like. In this respect, the card 24 would be placed on top of or against the object, the colour of which is to be sampled, such that the colour thereof shows through the cut out portion 244. Using a mobile phone, digital camera, or the like, the user then takes a still image of the object to be sampled with the colour capture card in the image, and sends it to the back end server 10, using the various communication routes described previously, such as MMS, email, or using web access.

Figure 3:
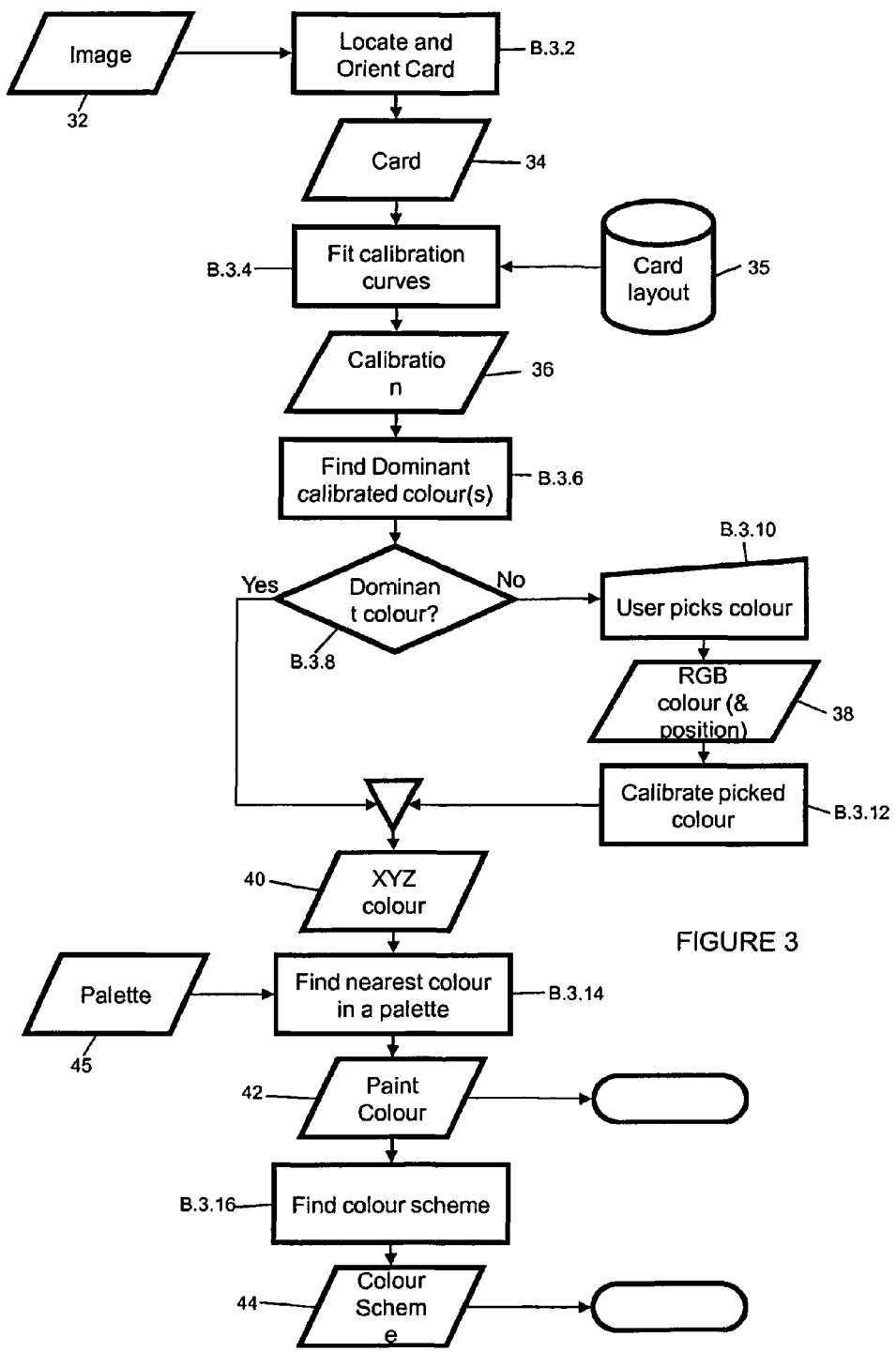
FIG. 3 is a flow diagram of a process performed in an embodiment of the invention.

FIG. 3 shows the process performed at the back-end server 10 in more detail.

Firstly, the image data 32 sent by the user is received at the network interface 102 of the back-end server 10. The back-end server 10 is controlled by the colour match control module 114 running on the processor 104. When image data is received, the colour match control module 114 first, optionally, performs image processing to locate and orient the calibration colour sample card 24 within the image 32. This is performed at block 3.2, and is optional because it maybe that, depending on the instructions given to the user, this step is not required. For example, the calibration colour sample card 24 may come with instructions to the user to capture an image such that the position of the card within the image is not skewed. In addition, the user may be instructed to crop the image such that the image is solely of the calibration card 24 in a known rotational orientation, before it is sent to the back-end server 10. If the user is provided with such instructions and carries them out, then there will be no need to perform any location or card orientation routines. In this case, therefore, the image received 32 will be an image solely of the calibration card with the unknown sample in a known orientation, i.e. it will be a card image 34 of the card and sample.

Once a card image 34 has been obtained, the colour match control module 114 controls the processor 104 to launch calibration module 118 in order to perform regression analysis to characterise the colour capture characteristics of the user's image capture device. The regression analysis used in the present embodiment is substantially the same as described previously in U.S. Pat. No. 5,150,199 and WO01/25737, and is shown in more detail in FIG. 5. In respect of FIG. 3, the regression analysis to characterise the device is performed in block 3.4, with reference to the calibration card layout 35, known from the colour card data 112, stored in colour database 110.

The iterative regression algorithm involves two individual processing steps as follows:

Step 1: Determine 3 relationships between each of the measured R, G and B components and the known X, Y and Z components using the greyscale colour samples on the calibration colour sample card 24, i.e.

X as a function of R (named function $R_1$).
Y as a function of G (named function $G_1$).
Z as a function of B (named function $B_1$).

A power curve fit may be used on the greyscale data to obtain the relationships $R_1$, $G_1$, $B_1$ in Step 1 above. It is also possible to use polynomial curve fits, of either $2^{nd}$, $4^{th}$ or higher orders.

Step 2: Determine multi-variant linear relationships between each of the known X, Y and Z components and the three functions determined in Step 1 above, i.e.

X as a function of $R_1$, $G_1$, $B_1$ (named function $X_1$).
Y as a function of $R_1$, $G_1$, $B_1$ (named function $Y_1$).
Z as a function of $R_1$, $G_1$, $B_1$ (named function $Z_1$).

Step 2 in the algorithm performs multi-variant regression of X, Y and Z against the power curve fits $R_1$, $G_1$ and $B_1$ obtained in Step 1, i.e.

$$X = f(R_1, G_1, B_1)$$

$$Y = f(R_1, G_1, B_1)$$

$$Z = f(R_1, G_1, B_1)$$

or $$X = a + b \cdot R_1 + c \cdot G_1 + d \cdot B_1$$

$$Y = a + b \cdot R_1 + c \cdot G_1 + d \cdot B_1$$

$$Z = a + b \cdot R_1 + c \cdot G_1 + d \cdot B_1$$

where a, b, c and d are constant coefficients. The three multi-variant regression fits of X, Y and Z are denoted $X_1$, $Y_1$ and $Z_1$ respectively.

Figure 5:
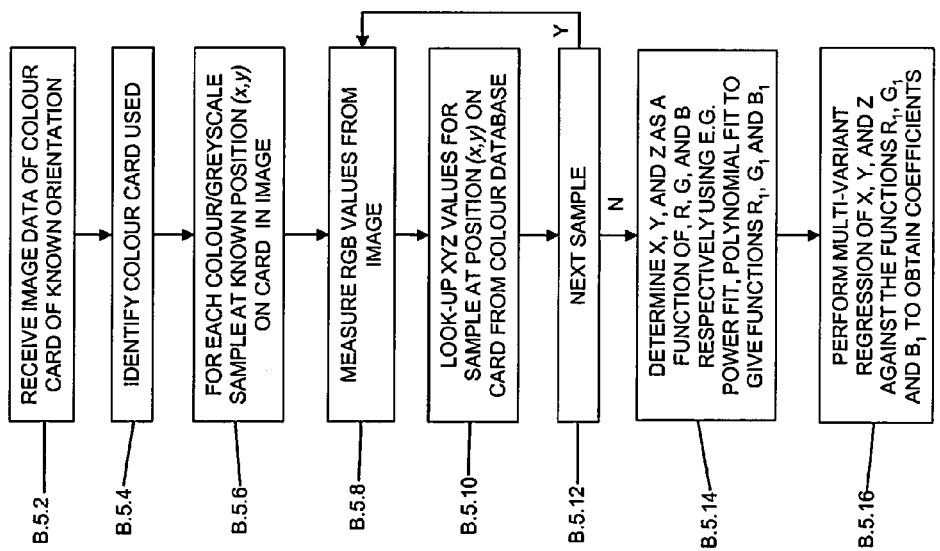
FIG. 5 is a flow diagram describing a colour calibration process used in an embodiment of the invention.

FIG. 5 shows the above in more detail. In particular, the process of FIG. 5 would be performed as block 3.4 in FIG. 3.

Firstly, at block 5.2, as discussed, image data from a colour card of known orientation is received. It is then necessary to identify the colour card used at block 5.4, and this is performed using identifying mark 246 located on the calibration card 24. That is, recognition of the identifying mark 246 is performed, and this mark is then used as an index to select the appropriate set of colour card data from colour card database 110.

Next, the first step of the above-noted algorithm is started, extending from blocks 5.6 to 5.14. That is, at block 5.6 a process loop is started to read data from the image, at known positions in the image. That is, at block 5.6, each greyscale sample at known position (x, y) on the calibration card 24 has its RGB values measured from the image at block 5.8, and then the tristimulus XYZ values for that sample at the same position (x, y) are looked up from the database, at step 5.10. This process is repeated for all the greyscale samples on the image, which, with the calibration card 24 are located on the outer edge of the colour samples, as samples 250. In alternative embodiments, this step does not need to be limited to the greyscale samples, and the other colour samples could also be used in addition, or as an alternative.

Figure 12:
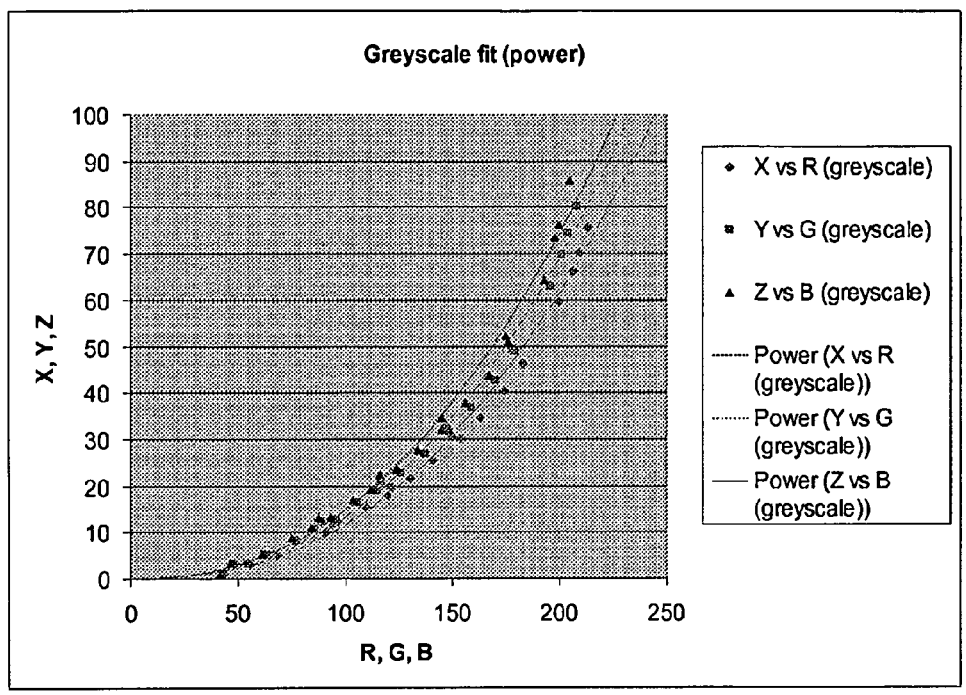
FIG. 12 is a graph showing a greyscale power fit obtained from a calibration process during a test of an embodiment of the invention.
Figure 16:
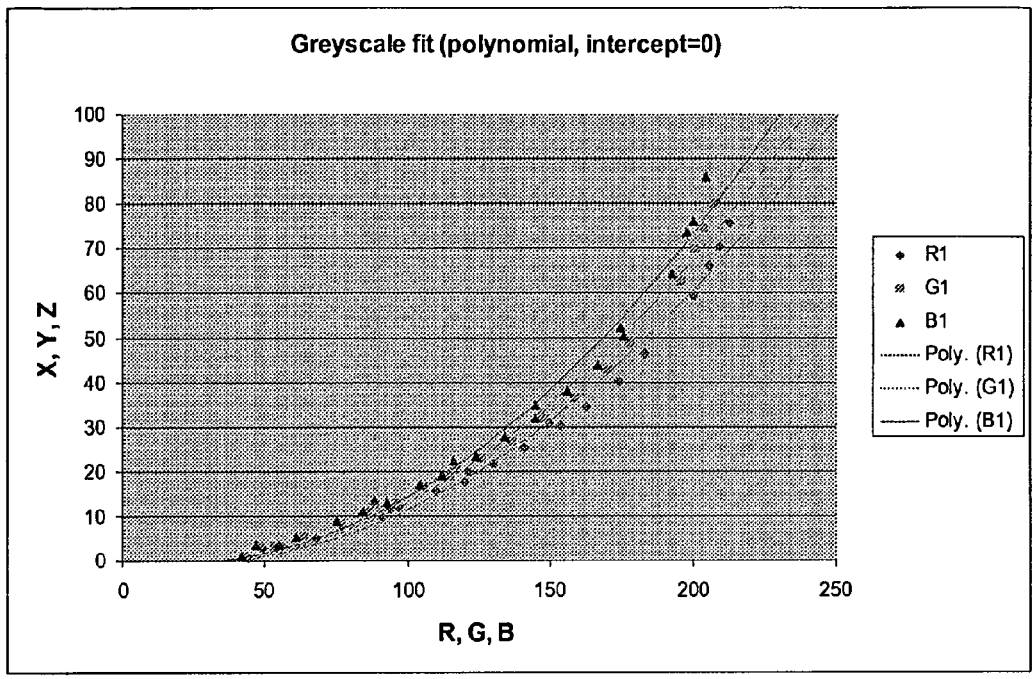
FIG. 16 is a graph of a greyscale fit using a second order polynomial.
Figure 17:
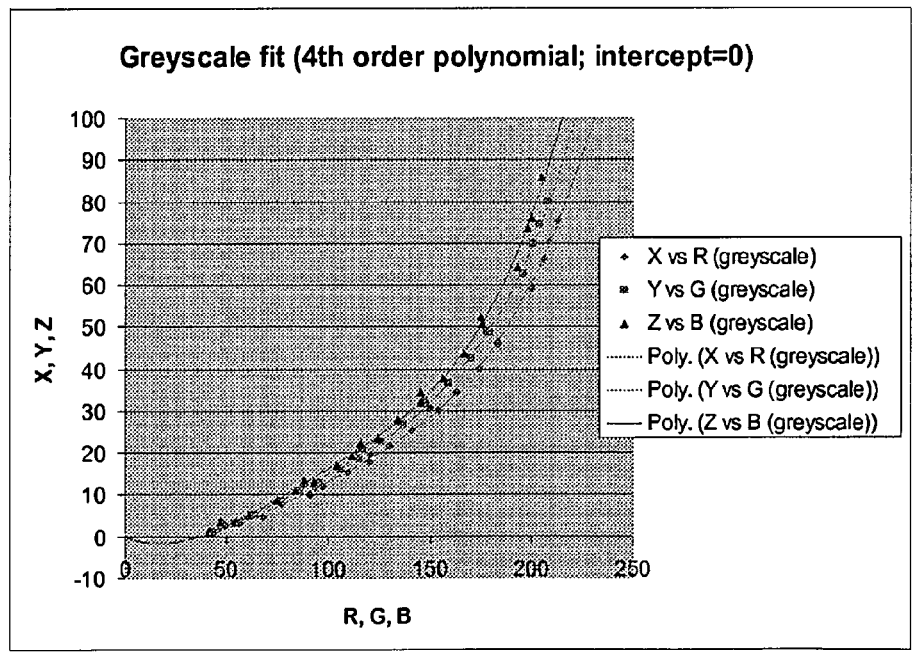
FIG. 17 is a graph of a greyscale fit using a forth order polynomial constrained to intercept at zero.

By the end of the processing constituting blocks 5.6 to 5.12, therefore, for each known colour or greyscale sample in the image, the tristimulus XYZ values will have been obtained from the appropriate colour card data in the colour database 110, and the RGB values of that colour sample on the image will have been measured. The corresponding RGB and XYZ values are stored associated with each other in the memory 106. For example, it is possible to plot the measured RGB values for each known sample against the known XYZ values of that sample on a graph, as shown in FIGS. 12, 16, and 17.

Once the RGB values have been measured, and the corresponding XYZ values looked up from the colour database, at step 5.14, the above-noted step 1 of the algorithm is performed, to determine the X values as a measured function of the R values, the Y values as a function of the measured G values and the Z values as a function of the measured B values. This step is performed using either a power fit or a polynomial fit, to obtain a function relating to X to R, Y to G and Z to B. Typically, a power fit will give an equation of the form:—

$$X_i = \alpha_X R_i^{\beta_X}$$

$$Y_i = \alpha_Y G_i^{\beta_Y}$$

$$Z_i = \alpha_Z B_i^{\beta_Z}$$

wherein the co-efficients $\alpha_{x, y, z}$ and $\beta_{x, y, z}$ characterise the respective relationships.

Figure 11:
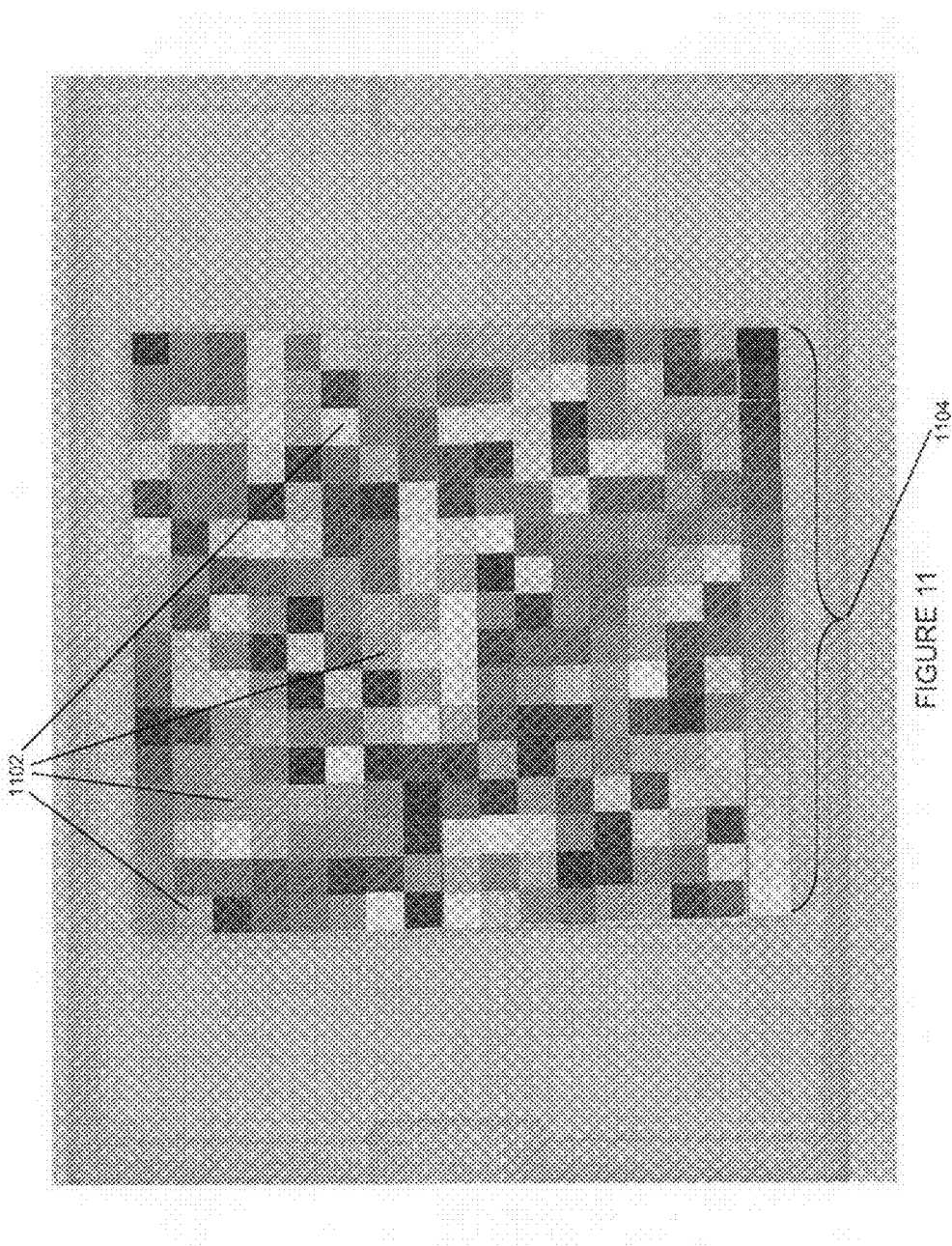
FIG. 11 is a photograph of an experimental colour calibration sample template used for tests of an embodiment in the invention.

FIGS. 12, 16, and 17 illustrate example curve fits that have been obtained for experimental test data performed on images captured of a test calibration sample array 1102 shown in FIG. 11. FIG. 11 shows an array of colour sample patches 1102, together with greyscale patches 1104, located at the bottom of the array. The colour sample patches 1102 comprise 256 randomly arranged standard colours, including six greyscale standards. The greyscale patches 1104 comprise 16 greyscale colours ranging from black to white.

In order to test the process, the experimental test array of FIG. 11 was lit using a D65 light and an image was captured using a high-end digital camera (a Cannon Powershot Pro 90IS). XYZ tristimulus data from the colour patches in the test array was known in advance, indexed by position of the patch in the array. With this data, it was possible to plot the measured R, G, and B values for each patch against the known XYZ values for each test patch, as shown in FIGS. 12, 16, and 17. It should be noted that the plots of the data in each of the FIGS. 12, 16, and 17 is identical. What differs is the curve fit that has been applied. In particular, in FIG. 12 a power fit has been used, in accordance with the relationship described above. However, as noted, it is also possible to use a polynomial fit other than a power fit, and FIG. 16 shows a second order polynomial fit, whereas FIG. 17 shows a fourth order polynomial fit, where the function is constrained to intercept at zero. As will be described later, whether a power fit or polynomial fit is used, the results are substantially identical, and there appears to be little advantage, if any, in using a polynomial fit over a power fit.

Figure 13:
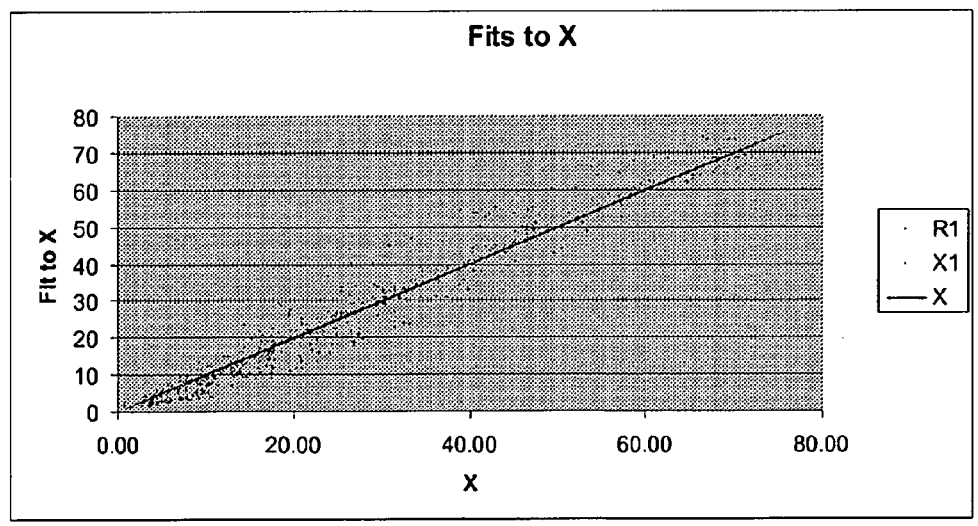
FIGS. 13-15 are graphs of the power function regression fits for X, Y and Z based upon the power functions shown in FIG. 12.
Figure 14:
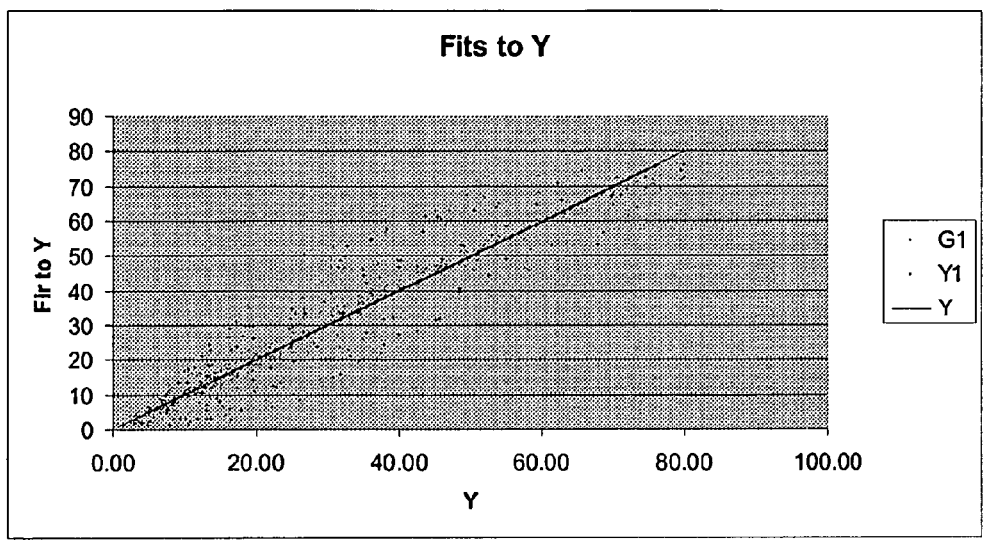
Figure 15:
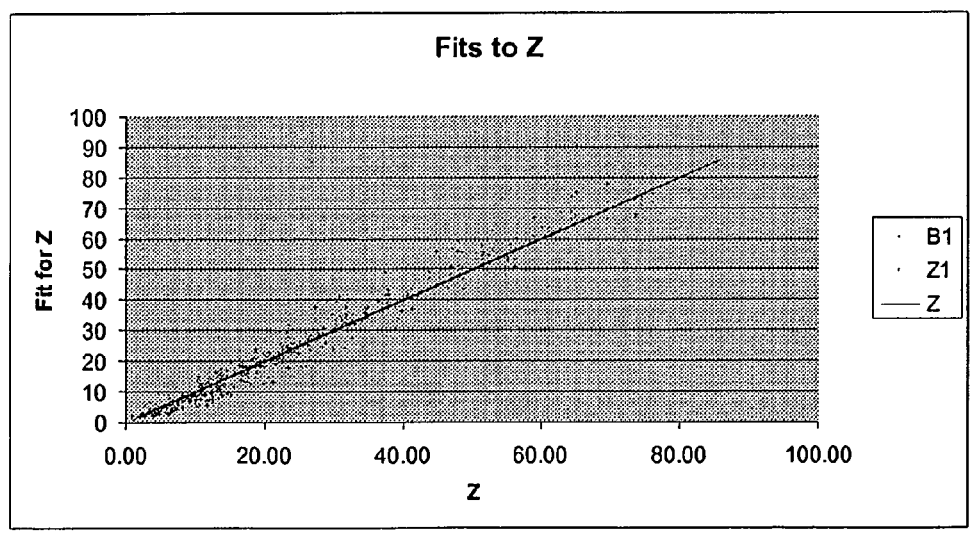

Once a curve fit has been performed to give the above-noted functions, next, at block 5.16, multivariate regression is performed of X, Y and Z against the obtained functions, to obtain coefficients relating to X to R, G, and B, Y to R, G, and B, and Z to R, G, and B, as noted in step 2 above. FIG. 13 illustrates a plot of known X against the regression fits R1 and X1, whereas FIG. 17 shows known Y against the regression fits G1 and Y1, and FIG. 15 shows a plot of known Z against the regression fits B1 and Z1. This finds constant coefficients (a, b, c and d in step 2 above) that help to characterise each of X, Y and Z as a function of R, G and B, as described above. Once these coefficients have been found i.e. the coefficients from both step 1 and step 2 of the algorithm above, they are stored, and thereafter characterise the colour capture function of the image capture device used by the user. Using these coefficients it is then possible to find the colour of the unknown sample in the image, from its RGB values.

Returning to FIG. 3, therefore, at block 3.4, the above-noted calibration process is performed and this returns a set of calibration coefficients 36, which can then be used for subsequent colour determination.

Firstly, however, it is necessary to determine whether there is any dominant colour in the known colour sample, and this is performed at block 3.6. For example, RGB pixel values representing the unknown sample could be examined to determine whether there is a dominant RGB value. Alternatively, if there is no dominant RGB value, where a web interface is being used then at block 3.10 a user may be asked to pick a colour to be calibrated. At block 3.12 the picked colour is then calibrated. In a later embodiment we will describe a clustering process which is able to identify multiple colours in the unknown sample and return a calibrated colour for each of them.

At block 3.12, the picked colour is calibrated, using the calibration coefficients 36. That is, the RGB values are applied to the equations found at block 3.4 using the calibration coefficients 36. This process gives the XYZ tristimulus value of the picked colour.

Having found the XYZ values of the unknown colour sample (or the picked dominant value in the colour sample, if there is more than one colour) the colour match control module 114 then acts to find the nearest colour in an available colour palette, at block 3.14. In this respect, colour palette data 45 is available to the colour match control module 114 and is stored in the colour database 110. Finding the nearest colour is performed by using a colour difference measure, and comparing the XYZ colour that has been determined to each colour in the palette using the difference measure, the colour with the smallest difference being chosen. Several different difference measures can be used, but in embodiments of the invention it is preferable to use the CIE Delta E measures. In particular, the original CIE Delta E (1976) colour difference measure may be used, or in another embodiment the CIE Delta E (2000) measure. In a further embodiment, Delta E (2000) may be used but with different weighting factors.

The colour matching process at block 3.14 returns a matching paint colour being the paint colour in the palette that is closest to the determined XYZ colour of the test sample. This paint colour information 42 is then provided back to the user via the network interface 102 over the network 22. For example, where the user has transmitted the image to the back-end server 10 by MMS using a mobile device, the network interface 102 may formulate a short message service (SMS) or MMS message to send the paint colour information back to the user mobile device. Alternatively, where the user has sent an email to the back-end server 10, the network interface 102 may formulate an email in reply with the paint colour information. Where a web interface is used, a webpage may be sent to the user for display by a user web browser, giving the matching paint colour information.

Finally, in some embodiments of the invention in addition to returning the paint colour information 42, at block 3.16 the back end server 10 also acts to find a colour scheme that complements the determined paint colour 42. For example, there are several methodologies for determining colour schemes that complement each other. For example, a colour that is 120° away from a first colour on the CIELAB colour wheel is often considered to be a complementary colour. In addition, a colour that is 180° away from a first colour on the CIELAB colour wheel is also considered to be complementary. Therefore, at block 3.16, such complementary colour determining techniques are used, to determine colour scheme information 44, which is also returned to the user.

Therefore, in the first embodiment, a user may take a digital photograph using his mobile phone or his digital camera, of an object, the colour of which is to be determined. The photograph is taken by placing the calibration colour sample card 24 over, next to, or near the object, such that both the calibration colour sample card 24, and the object are captured in the image. The user then sends the image via a telecommunications network from his home to the back-end server. In this respect, contact details such as an email address, MMS number, or web address, may be provided on the back of the calibration colour sample card 24. The back-end server 10 receives the image, processes the image as described to determine the actual colour of the object to be determined, and then matches that colour to a paint palette to determine a matching paint colour to the object. Information regarding the matching paint colour is then returned in a reply to the user, over the telecommunications network. The reply may be, for example, by email, SMS, MMS, or by transmitting an appropriate webpage for display in a browser on the user's computer or mobile phone. With such an arrangement, the ability of a user to easily match paint colours is greatly enhanced. In particular, it is no longer necessary for the user to obtain multiple sets of colour sample cards from his local paint store, and then attempt to match colours using his own perception. Instead, a much more accurate and mathematically rigorous colour match can be obtained. In addition, no specialist equipment is required to capture the image, and the user can use image capturing equipment that he would typically own.

In order to assess the results from the above noted process, measured RGB data for two template standards (a second template standard is shown in FIG. 11, described previously; a first template standard is the same, but without the greyscale patches 1104 at the bottom) was also used as sample input data. This RGB input data was used to calculate calibrated XYZ values using the methods described above. The calibrated XYZ colours determined were then compared numerically to the known XYZ values to provide a measure of the effectiveness of the regression fits in the algorithm. For this purpose, two standard measures of perceptual difference, CIE dE, and CIE DE2000 were used.

The table below displays the average dE and also DE2000 values obtained for each of the methods described above.

| Greyscale fit type | XYZ components | Mean dE (std) | Mean DE2000 |
|---|---|---|---|
| Test 1, Template 1; PowerShot S30 camera under natural daylight | | | |
| Power function | $X_1, Y_1, Z_1$ | 6.04 | 3.78 |
| Test 2, Template 2 (extra NCS greys); DigiEye camera under D65/10° light | | | |
| Power function | $X_1, Y_1, Z_1$ | 4.64 | 2.83 |
| $2^{nd}$ order polynomial | $X_1, Y_1, Z_1$ | 4.31 | 2.68 |
| $4^{th}$ order polynomial | $X_1, Y_1, Z_1$ | 4.80 | 2.83 |

The data in the above table indicates that replacement of the power curve fit to the greyscale data with polynomial fits has little effect on the resulting $X_i, Y_i, Z_1$ values with little or no effect on average DE2000. Therefore replacement of the power curve fit to the greyscale data with polynomial fits results in no significant improvement to the calibration. This may be because any scatter in the greyscale curve fit is taken into account in the multi-variant regression process in Step 2.

In terms of the results, the dE difference measures are designed such that the minimum noticeable difference to a human observer would have a dE value of 1. However, for many people a dE of 1 would result in no noticeable difference in colour, and particular if the colours are not placed side by side. In the present case, the described colour determination process when used on the template with the additional greyscale values used in the iterative regression (test 2, using the template shown in FIG. 11) results in calculated XYZ values having a mean dE2000 of less than 3 from the actual XYZ values in every test case.

2. Second Embodiment

Image Orientation

A second embodiment of the invention will now be described. The second embodiment of the invention takes as its basis the first embodiment described above, and hence common features therebetween will not be described again.

The second embodiment relates to the image orientation performed in block 3.2 of the process of FIG. 3. More particularly, as described previously in the first embodiment such image orientation may not have been necessary, as the user may have produced the card image by manually cropping and rotating the image of the calibration colour sample card 24 and unknown sample prior to sending it to the back-end server. In this respect, the user when taking the image could ensure that the orientation of the card to the image plane is correct, without any perspective, or skew.

However, for lay users it is more preferable that no pre-processing is required to be performed by the user to the image, or that no special conditions must be met in the image orientation when taking the image. Instead, the system should be as easy for lay users to use as possible, requiring only that they are able to take a picture of the calibration colour sample card 24 with the unknown colour sample, with the calibration colour sample card 24 in any orientation. By so doing, the system will be easy for lay users to understand and use, and hence will promote use of the system.

In the second embodiment, therefore, in order to allow for easy use image 32 received at the back end server may contain an image of the calibration colour sample card 24 in any orientation. However, in order to process the data in the image the orientation of the calibration colour sample card 24 and the position of the colour sample patches on the card in the image needs to be known. Therefore, at block 3.2 card image location and orientation is performed, by image orienting module 116.

Figure 4:
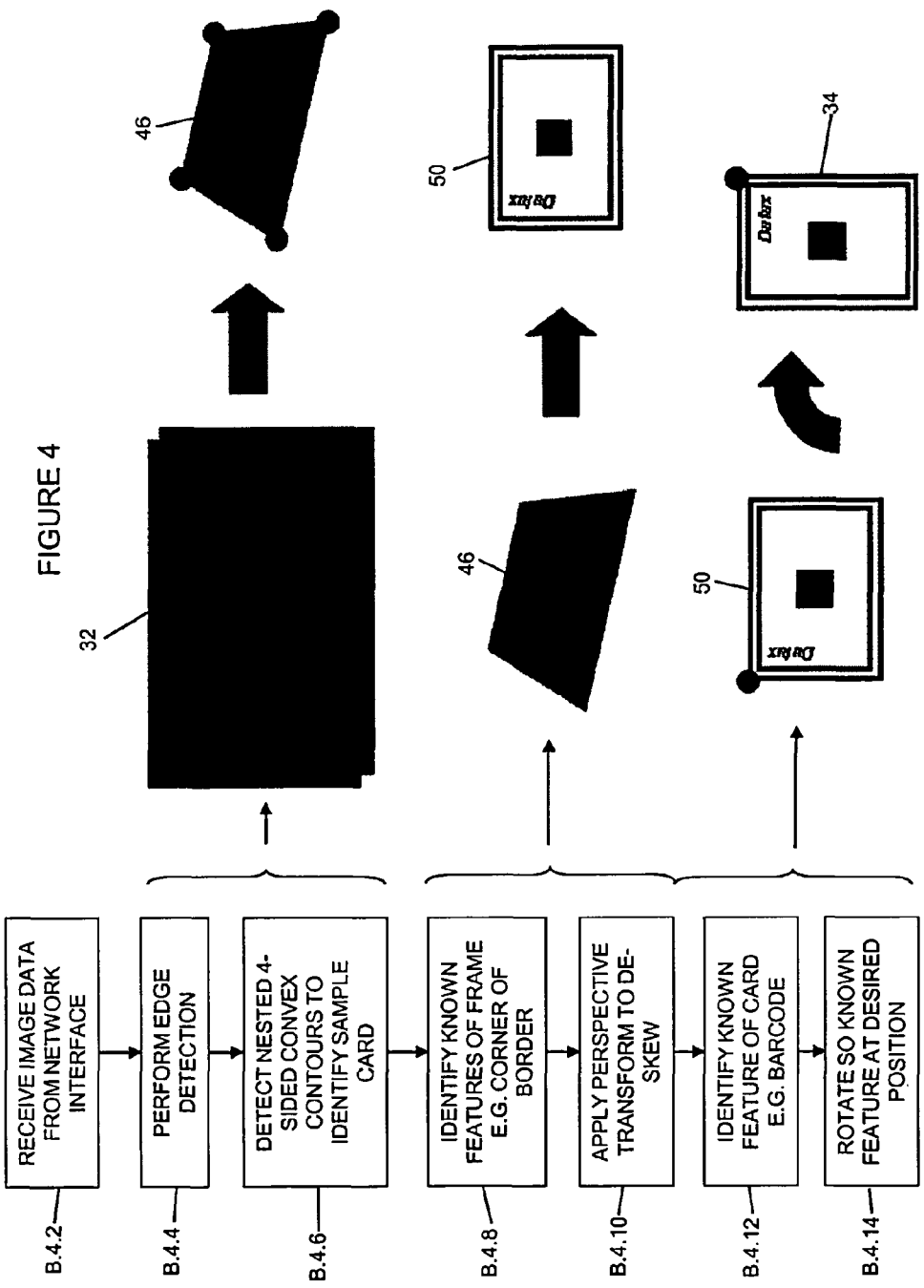
FIG. 4 is a flow diagram and associated drawings illustrating an image orientation process used in an embodiment of the invention.

FIG. 4 shows the operation of the image orienting module 116 in more detail. Firstly, at block 4.2 the image data 32 is received from the network interface 102 (or from colour match control module 114). In order to locate the calibration colour sample card 24 within the image, at block 4.4 edge detection is performed on the image, to detect high-contrast edges. In this respect, the calibration colour sample card 24 has a thick double border 248 that can be used to locate the card in the image 32, the border being readily susceptible to being identified by edge detection algorithms. Once such contours in the image have been found then at block 4.6 we look for a series of nested 4-sided, convex contours that has the correct sequence of orientations and where each child is a significant fraction of the size of its parent. In this respect, the thick border appears after edge detection as two nested four sided shapes, and hence identification of such a nested shape in the image identifies the card 24.

Having determined the position of the card 24 in the image using the above, the image may be segmented to leave card image data 46, as shown. It is then necessary to identify known features on the card in order to be able to perform a perspective transform to de-skew the image. Therefore, at block 4.8 known features of the card are identified, such as the corners of the card. Note that it is possible to use any fiduciary marker to identify fixed points on the calibration card, but that in the present embodiment we need to identify 4 points on the card in order to do the perspective transformation.

Having identified known points on the card image, at block 4.10 we use the known points (e.g. the corners of the innermost border) to do a perspective transform to de-skew the image. De-skewed card image 50 is shown by way of example in FIG. 4. However, this de-skewed card image 50 could have any rotational orientation, so we use a priori knowledge of the expected layout of the card to correctly orient the card. In this respect, colour card data 112 in stored in colour database 110, the colour card data 112 storing information relating to the location of a fiduciary feature that can be recognised and used to orient the card. For example, the barcode or trademark along one edge of the frame has white areas next to it. It is therefore possible to look at the lightest 2 corners and rotate the image to have these at the bottom. Hence, at block 4.12 a known feature relating to the rotational orientation of the card is recognised, and the de-skewed card image 50 is then rotated at block 4.14 such that the feature is placed into the known rotational orientation, thus rotationally orienting the card. As such, card image data 34 of known orientation is obtained.

In other embodiments it is possible to use any known feature of the card to achieve rotational orientation. This could also be achieved by making one of the fiduciary features different to the others. Another possibility would be to make the layout of the samples on the card rotationally symmetric so that the rotational orientation of the card was immaterial.

The overall result of the above steps is that the user does not need to intervene to find the card in the image, and neither are any special requirements placed on the user as to how the image should be taken, or pre-processed prior to being sent to the back-end server. As such, a much more user-friendly system is obtained, that is likely to be used more by lay users.

3. Third Embodiment

Spatial Brightness Correction

A third embodiment of the invention will now be described. The third embodiment takes as its basis either of the first or second embodiments previously described, and hence common features therebetween will not be described again.

The third embodiment of the invention focuses on improving the determination of the calibration coefficients performed at block 3.4 of the process of FIG. 3, and in particular to take into account differences in brightness and contrast across the card image 34. That is, the user may have taken the image 32 in imperfect lighting conditions, such that across the card 24 there are lighting differences such that brightness and contrast across the card are not uniform.

The third embodiment of the invention presents additional processing that can be performed in the calibration stage to extend the calibration model to take into account such spatial lighting differences. The embodiment presents a method that assumes a linear change in brightness of contrast across the card, although it would be possible to find higher order coefficients that model higher order changes.

Figure 7:
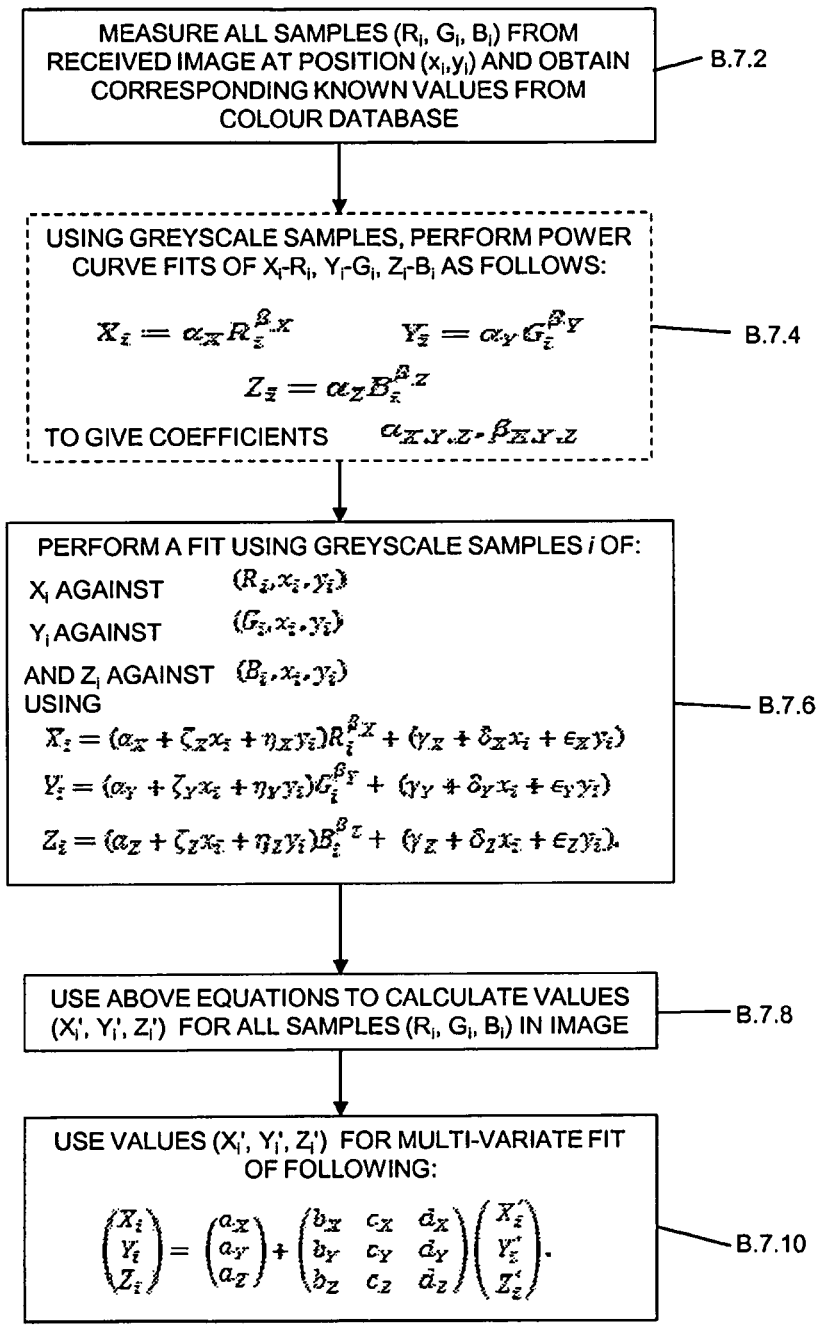
FIG. 7 is a flow diagram illustrating part of a spatial brightness calibration process used in an embodiment of the invention.

FIG. 7 illustrates the process in more detail. The process comprises two main steps (B.7.6 and B.7.10). Firstly, at block 7.2 samples G, and B, at $(x_i, y_i)$ in the image are measured, and the corresponding XYZ values $X_i$, $Y_i$, and $Z_i$ are obtained from the colour card data in the colour database. Then, respective relationships are found that map known X to measured R, taking into account the (x,y) position of each measured R in the card image 34. The same is also done to map known Y to measured G, and known Z to measured B. That is, considering X-R in more detail a relationship is formulated that relates X to R using a power fit, but where the coefficient of R is dependent on position in the card image. In addition, an offset term is also introduced into the equation that is also dependent on position. That is, the relationship to be found between X and R is position dependent, dependent on the position of samples on the card. Similar position dependent relationships are also found between Y and G, and Z and B. In the present embodiment the following equations are used:

$$X_i = (\alpha_X + \zeta_X x_i + \eta_X y_i) R_i^{\beta_X} + (\gamma_X + \delta_X x_i + \epsilon_X y_i)$$

$$Y_i = (\alpha_Y + \zeta_Y x_i + \eta_Y y_i) G_i^{\beta_Y} + (\gamma_Y + \delta_Y x_i + \epsilon_Y y_i)$$

$$Z_i = (\alpha_Z + \zeta_Z x_i + \eta_Z y_i) B_i^{\beta_Z} + (\gamma_Z + \delta_Z x_i + \epsilon_Z y_i)$$

where, $\alpha_{X, Y, Z}, \beta_{X, Y, Z}, \zeta_{X, Y, Z}, \eta_{X, Y, Z}, \gamma_{X, Y, Z}, \delta_{X, Y, Z},$ and $\epsilon_{X, Y, Z}$ are fixed coefficients, and $(x_i, y_i)$ is the position of the ith sample on the card, $R_i$, $G_i$, and $B_i$ being the measured RGB values of the ith sample. However, in other embodiments different equations may be used—any relationship that takes into account the position of samples on the card may be used.

The above equations are solved using a least squares fit method at B.7.6 to determine values for $\alpha_{X, Y, Z}, \beta_{X, Y, Z}, \zeta_{X, Y, Z}, \eta_{X, Y, Z}, \gamma_{X, Y, Z}, \delta_{X, Y, Z},$ and $\epsilon_{X, Y, Z}$. However, it may be that without any a prior knowledge these equations will not solve easily (local maxima or minima may be found). Therefore, optionally (at block 7.4) the coefficients $\alpha_{X, Y, Z}, \beta_{X, Y, Z}$ can be found in advance using the greyscale samples in the image without position dependence, and performing a (least-squares) fit of a power curve for $X_i$ against $R_i$ and then similarly for $Y_i$ against $G_i$ and $Z_i$ against $B_i$ giving the 6 coefficients $\alpha_{X,Y,Z}, \beta_{X,Y,Z}$:

$$X_i = \beta_X R_i^{\beta_X}$$

$$Y_i = \alpha_Y G_i^{\beta_Y}$$

$$Z_i = \alpha_Z B_i^{\beta_Z}$$

Note that these equations do not take into account any spatial brightness distribution, but are performed to provide initial values of $\alpha_{X,Y,Z} \beta_{X,Y,Z}$ that can then be used in solving the position dependent equations.

Next, at block 7.8 these 21 coefficients (7 per channel—$\alpha_{X,Y,Z}, \beta_{X,Y,Z}, \zeta_{X,Y,Z}, \eta_{X,Y,Z}, \gamma_{X,Y,Z}, \delta_{X,Y,Z}$, and $\epsilon_{X,Y,Z}$) are used to calculate values $(X_i', Y_i', Z_i')$ for all the known samples in the image $(R_i, G_i, B_i)$—not just the greyscale samples. These are then used for a multivariate fit at block 7.10—essentially performing a least squares fit of these samples against the measured values $(X_i, Y_i, Z_i)$ using the equation $$\begin{pmatrix} X_i \\ Y_i \\ Z_i \end{pmatrix} = \begin{pmatrix} a_X \\ a_Y \\ a_Z \end{pmatrix} + \begin{pmatrix} b_X & c_X & d_X \\ b_Y & c_Y & d_Y \\ b_Z & c_Z & d_Z \end{pmatrix} \begin{pmatrix} X_i' \\ Y_i' \\ Z_i' \end{pmatrix}.$$

The multivariate fit then provides a further 12 coefficients ($a_{X,Y,Z} b_{X,Y,Z} c_{X,Y,Z} d_{X,Y,Z}$). The set of 21 coefficients $\alpha_{X,Y,Z} \beta_{X,Y,Z} \zeta_{X,Y,Z} \eta_{X,Y,Z} \gamma_{X,Y,Z} \delta_{X,Y,Z}$, and $\epsilon_{X,Y,Z}$ and 12 coefficients $a_{X,Y,Z} b_{X,Y,Z} d_{X,Y,Z} d_{X,Y,Z}$ are then stored as the calibration data 36. These 21+12 coefficients can then be used subsequently (at B.3.12 in FIG. 3) to calculate the XYZ value $(x_{samp}, Y_{samp}, z_{samp})$, of the RGB colour of interest $(R_{samp}, G_{samp}, B_{samp})$ using the above equations.

Thus, in the third embodiment the calibration process is adapted so as to take into account variations in brightness and contrast over the card 24 in the image. This makes the system even easier to use, and places fewer constraints on lighting of the imaged scene whilst still allowing good results to be obtained.

4. Fourth Embodiment

Regression Analysis Using Reduced Colour Space

A fourth embodiment of the invention will now be described. The fourth embodiment takes as its basis any of the first, second, or third embodiments already described, and hence common elements therebetween will not be discussed again.

In the embodiments described so far, the regression analysis to find the calibration coefficients has made use of as many of the samples on the card as possible across the whole colour space. However, in the present embodiment, if some a priori knowledge of the potential colour of the unknown sample to be determined can be obtained, then the regression analysis to determine the calibration coefficient can be performed using those known colour samples that are close to the colour of the unknown sample. This is akin to "zooming in" to that part of the colour space of interest i.e. that part of the colour capture response of the user image capture device that is actually of most interest in that it is that part that has been used to capture RGB values of the unknown sample. This smaller part of the colour capture response can then be characterised as closely as possible to try and improve accuracy.

In more detail, the normal calibration process involves 2 main steps:
1. Regression analysis of measured samples and their known colours ('standards') to produce calibration coefficients that characterise the device used to make the image.
2. Use of the calibration coefficients to take a known RGB colour (and position relative to the calibration frame) and produce an XYZ colour.

Figure 6:
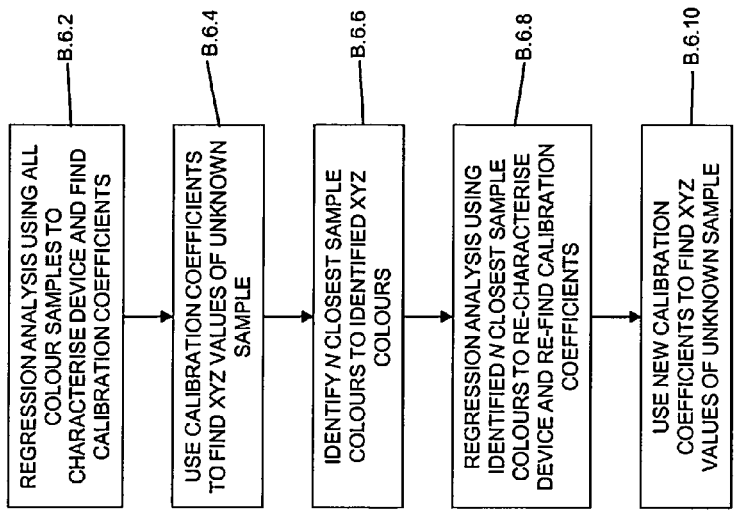
FIG. 6 is a flow diagram illustrating a multiple pass process used in an embodiment of the invention.

In the present embodiment we extend this process to include a second pass: once the first-pass XYZ colour is known, a subset of the known samples ('standards') on the calibration card is then used to repeat step 1. In the present embodiment we use the N closest standards to the calibrated colour (from step 2) and take separate sets of closest colours for the gamma correction part of the calibration (e.g. B.5.14 in FIG. 5) and multi-variate analysis part (e.g. step B.5.16 in FIG. 5). Further details are shown in FIG. 6.

More particularly, at block 6.2 a first pass through the process of FIG. 3 is performed, from blocks B.3.4 to B.3.12. That is, the calibration coefficients are found in the manner described in the previous embodiment, using all known colour samples on card 24. Then, the XYZ colour of the unknown colour sample is determined, at block 6.4.

This information is then used to identify the N closest sample colours to the identified XYZ colour of the unknown sample, at block 6.6. In this embodiment, $N_G$ closest greyscale samples are found, and $N_C$ closest colour samples, where $N_G$ is typically less than $N_C$. Details of tests performed to determine values for $N_G$ and $N_C$ will be given later. The closest greyscale and colour samples are found using a delta_E difference measure, such as delta_E(2000).

Having found the closest colours (greyscale and colour), at block 6.8 the calibration is performed again, to re-determine the calibration coefficients but this time using found closest colours only. As noted, this is akin to zooming or focussing in on a particular zone with the colour space. In theory, any local effects that are present in the calibration process should then be taken into account.

Having re-determined the calibration coefficients, at block 6.10 the XYZ values of the unknown sample are then recalculated using the new calibration coefficients and the measured RGB values from the image.

A number of tests have been performed to evaluate the effects of this re-calibration, and these are detailed below, with reference to FIGS. 18 to 21.

Test 1

As an initial assessment of this zonal calibration method, the measured RGB values for the two test templates previously discussed (the second test template is shown in FIG. 11—the first template is identical, but without the row of greyscale colours at the bottom) were used as sample RGB values. A range of subset sizes (i.e. values for $N_G$ and $N_C$) were tested in the second (zonal) pass as follows. The reported dE and DE2000 values are for the determined $X_1, Y_1, Z_1$ values.

| Test 1: Template 1 (6 greys), Canon PowerShot S30; natural daylight | | | |
|---|---|---|---|
| | # nearest colours | # nearest greys | Mean dE (std) | Mean DE2000 |
| 1st pass | 256 (all) | 6 | 6.04 | 3.78 |
| 2nd pass | 150 | 6 | 4.63 | 3.01 |
| 2nd pass | 150 | 3 | 4.48 | 2.85 |
| 2nd pass | 100 | 6 | 4.01 | 2.69 |
| 2nd pass | 100 | 3 | 3.87 | 2.56 |
| 2nd pass | 50 | 6 | 3.30 | 2.29 |
| 2nd pass | 50 | 3 | 3.30 | 2.24 |
| 2nd pass | 25 | 6 | 2.80 | 1.97 |
| 2nd pass | 25 | 3 | 2.85 | 1.96 |

Figure 18:
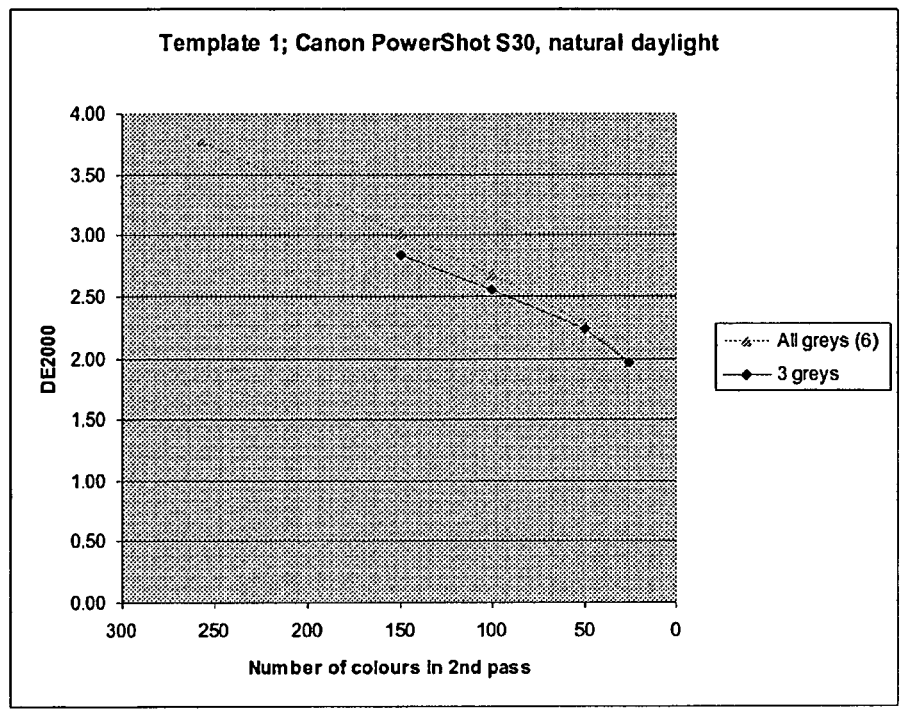
FIGS. 18-21 are graphs of test results obtained from an embodiment where a second processing pass is performed.

It is clear from the table above, that in all cases the second zonal pass improves the average dE and DE2000 values (there is less scatter). FIG. 18 summarises the data with a decrease in the number of template colours ($N_C$) used in the second pass resulting in significant improvements in DE2000. Reducing the number of greyscale template colours ($N_G$) to use in the $2^{nd}$ pass also improves DE2000 although the effect is not as significant as that obtained by reduction of colours.

Test 2

Similar analysis was performed on the data from the second template (shown in FIG. 11). As with the first template, the $2^{nd}$ pass results in a significant improvement in average dE and DE2000 (see table below). The results are displayed graphically in FIG. 19.

Test 2: Template 2 (23 greys), Canon PowerShot Pro90 IS (DigiEye), D65 illuminant

|  | # nearest colours | # nearest greys | Mean dE (std) | Mean DE2000 |
|---|---|---|---|---|
| 1st pass | 272 | 23 | 4.64 | 2.83 |
| 2nd pass | 150 | 23 | 3.49 | 2.10 |
| 2nd pass | 150 | 10 | 3.42 | 2.07 |
| 2nd pass | 150 | 5 | 3.26 | 1.98 |
| 2nd pass | 100 | 23 | 3.00 | 1.83 |
| 2nd pass | 100 | 10 | 2.92 | 1.78 |
| 2nd pass | 100 | 5 | 2.81 | 1.72 |
| 2nd pass | 50 | 23 | 2.32 | 1.44 |
| 2nd pass | 50 | 10 | 2.26 | 1.40 |
| 2nd pass | 50 | 5 | 2.24 | 1.39 |
| 2nd pass | 25 | 23 | 1.95 | 1.23 |
| 2nd pass | 25 | 10 | 1.92 | 1.20 |
| 2nd pass | 25 | 5 | 1.93 | 1.20 |

Figure 19:
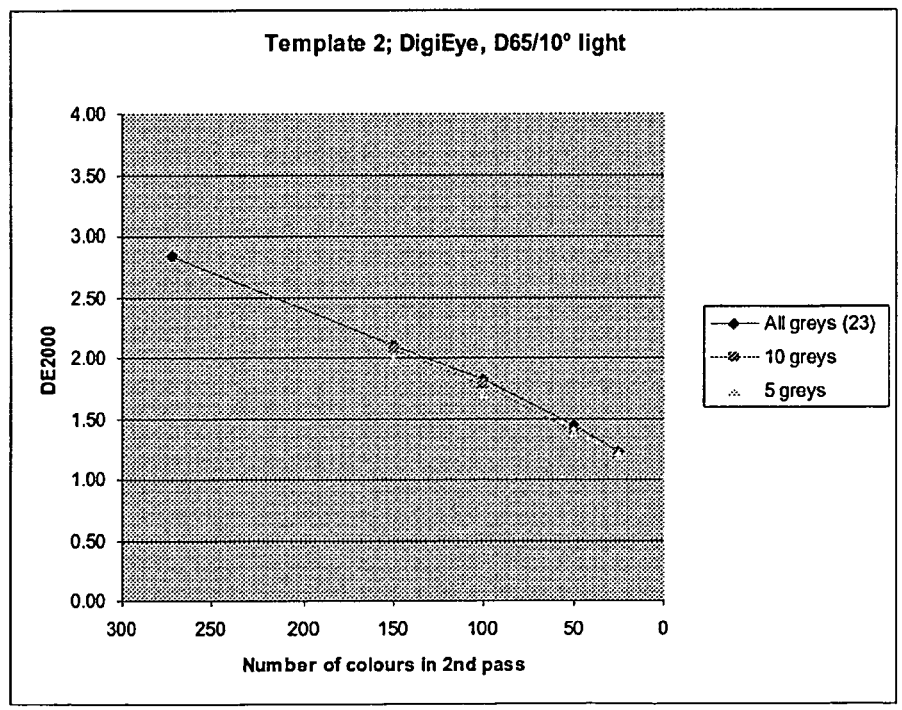

FIG. 19 demonstrates that reducing the number of colours ($N_C$ used in the calibration data subset for the second pass significantly improves the fidelity of the determined XYZ (i.e. lowers DE2000). However, reducing the number of greyscale samples ($N_G$) to use in the power curve fitting step in the $2^{nd}$ pass has little effect on colour fidelity.

Test 3 & Test 4

Test 3 and Test 4 use the standards on Template 2 but additionally have "real" sample data in the image with which to assess the zonal calibration method.

Test 3

Test 3 is a "best case" scenario using a high-end digital camera (DigiEye) under controlled lighting conditions (D65). The results from the 10 test samples are presented in the following table.

Test 3: Template 2 (23 greys), Canon PowerShot Pro90 IS (DigiEye), D65 illuminant

|  | # nearest colours | # nearest greys | Mean dE (std) | Mean DE2000 |
|---|---|---|---|---|
| 1st pass | 272 | 23 | 7.08 | 3.90 |
| 2nd pass | 150 | 23 | 6.12 | 3.45 |
| 2nd pass | 150 | 10 | 5.73 | 3.22 |
| 2nd pass | 150 | 5 | 5.30 | 2.93 |
| 2nd pass | 100 | 23 | 5.36 | 3.14 |
| 2nd pass | 100 | 10 | 5.08 | 2.96 |
| 2nd pass | 100 | 5 | 4.59 | 2.62 |
| 2nd pass | 50 | 23 | 4.41 | 2.67 |
| 2nd pass | 50 | 10 | 4.36 | 2.59 |
| 2nd pass | 50 | 5 | 3.84 | 2.28 |
| 2nd pass | 25 | 23 | 3.59 | 2.33 |
| 2nd pass | 25 | 10 | 3.64 | 2.30 |
| 2nd pass | 25 | 5 | 3.31 | 2.06 |
| 2nd pass | 10 | 23 | 3.30 | 2.07 |
| 2nd pass | 10 | 10 | 3.45 | 2.09 |
| 2nd pass | 10 | 5 | 3.39 | 2.03 |

Figure 20:
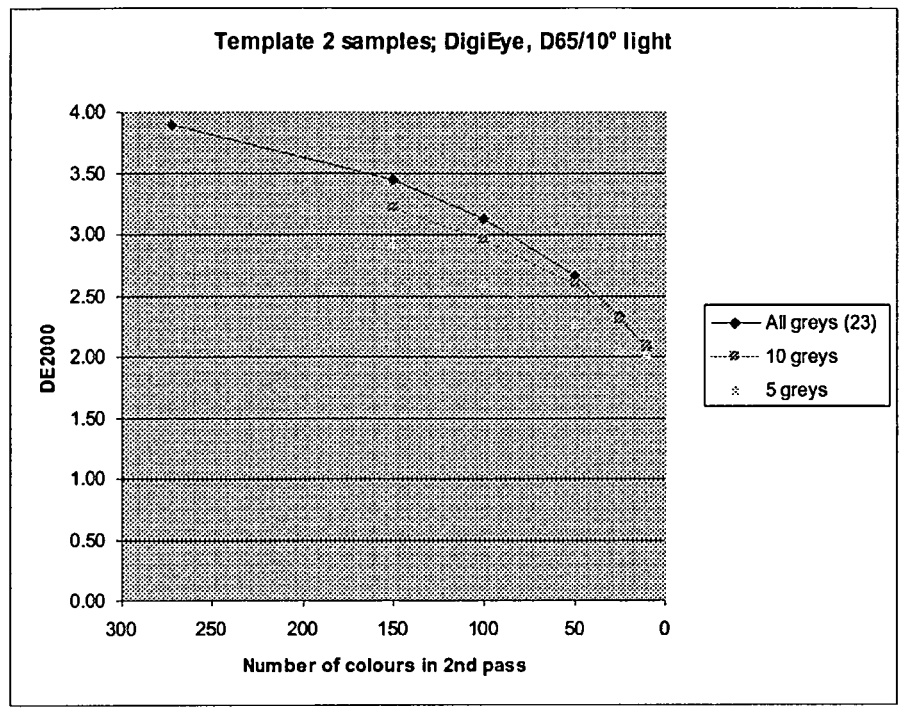

Once again, the $2^{nd}$ zonal pass reduces the average dE and DE2000 values providing an improvement over the single pass arrangement. The effect in DE2000 is shown in FIG. 20. Here, reducing both $N_G$ and $N_C$ has had an effect on lowering average delta_E values obtained.

Test 4

Test 4 is a "realistic case" scenario using an "off-the-shelf" digital camera (Canon PowerShot S30) under good natural daylight. The results from the 10 test samples are presented in the following table.

Test 4: Template 2 (23 greys), Canon PowerShot S30, natural daylight

|  | # nearest colours | # nearest greys | Mean dE (std) | Mean DE2000 |
|---|---|---|---|---|
| 1st pass | 272 | 23 | 7.23 | 3.69 |
| 2nd pass | 150 | 23 | 6.16 | 3.32 |
| 2nd pass | 150 | 10 | 6.08 | 3.25 |
| 2nd pass | 150 | 5 | 7.08 | 3.43 |
| 2nd pass | 100 | 23 | 5.27 | 2.95 |
| 2nd pass | 100 | 10 | 5.11 | 2.85 |
| 2nd pass | 100 | 5 | 5.47 | 2.84 |
| 2nd pass | 50 | 23 | 4.97 | 2.74 |
| 2nd pass | 50 | 10 | 4.80 | 2.64 |
| 2nd pass | 50 | 5 | 5.31 | 2.67 |
| 2nd pass | 25 | 23 | 5.06 | 2.80 |
| 2nd pass | 25 | 10 | 4.91 | 2.73 |
| 2nd pass | 25 | 5 | 5.36 | 2.74 |
| 2nd pass | 10 | 23 | 6.51 | 3.56 |
| 2nd pass | 10 | 10 | 6.38 | 3.49 |
| 2nd pass | 10 | 5 | 7.03 | 3.55 |

Figure 21:
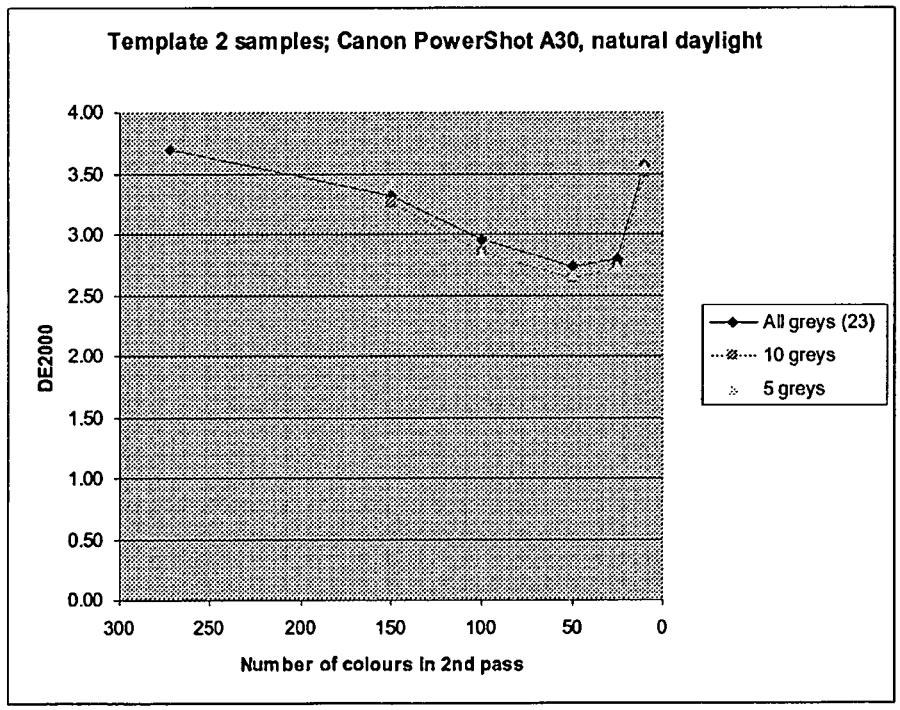

The effect in DE2000 is shown in FIG. 21. In this test, however, there are minima to the DE2000 values at approximately 50 standards. Reducing the number of greyscale standards to use in the second pass has little effect on DE2000.

These tests show that reducing the number of colours $N_C$ used in the multi-variate regression has an appreciable effect on accuracy of colour obtained for the unknown sample. In particular, provided some a priori knowledge of the colour of the unknown sample can be obtained then restricting to the nearest $N_C$ colours, where $N_C$ is in a range of 5 to 250, or more preferably 10 to 100, or even more preferably 20-100, or more preferably 30 to 70, or most preferably 40-60 for the multi-variate regression can improve accuracy of colour determination. FIG. 21 shows that the most accurate colour determination was obtained when about 50 nearest colours were used for the multi-variate analysis, although good results with a DE 2000 less than 3.0 are obtained where a number of colours within the range of about 20 colours to about 100 colours is used. In percentage terms this equates from around 8% to around 40% of the numbers of colours that may be available on colour card 24, assuming, for example, there are around 250 colours on the card.

In terms of how the a priori knowledge of the colour of the sample can be obtained, as noted above, in the present embodiment this is obtained by performing a first pass processing to determine the colour, and then performing a second pass with the reduced number of colours in the calibration step. However, this is not essential, and in other embodiments the a priori knowledge could be obtained some other way. For example, in one embodiment it may be possible to make an assumption about the nature of the characteristics of the imaging device (e.g. assume that the RGB colours are in the sRGB colour space). In another embodiment the reduced number of colours can be obtained by picking samples that have measured RGB values close to the RGB colour to be measured. In a further embodiment the colours on the colour card may be of a reduced range. For example, different versions of the colour card may be produced each having a subset of the colour space thereon i.e. a card having "reds", or another card having "blues". The user then selects the card having colours that are closest to the colour she wishes to match—for example, the user knows that she wishes to match a red cushion, and hence uses the card 24 having predominantly reds on it. In all of these cases a reduced set of colour samples that are known to be near the colour to be determined are used to perform the calibration, and hence local changes in the colour capture response of the device in that part of the colour space can be taken into account.

5. Fifth Embodiment

Clustering to Find Multiple Colours in Sample

A fifth embodiment of the invention will now be described. The fifth embodiment takes as its basis any of the first, second, third, or fourth embodiments already described, and hence common elements therebetween will not be discussed again.

The fifth embodiment of the invention presents a technique that may be used e.g. at block 3.6 of the process of FIG. 3, where there is more than colour in the unknown colour sample. For example, the user may have placed the card 24 over an item which is patterned, and which, although there is a dominant colour in the pattern, there are a number of subsidiary colours as well. In such a case a determination has to be made of which colour should be matched to. In the first embodiment the option was presented of identifying a single dominant colour, either by having the user pick a colour, or by determining a dominant colour using statistical measures on the pixels representing the sample. In the fifth embodiment. however, a clustering algorithm is used to try and identify each of several colours in the unknown colour sample, so that individual XYZ determination and matching may then be performed on each individual colour.

Within the fifth embodiment a k-means clustering algorithm is used to determine the major colours that are present in a sample image. K-means clustering is based on Euclidean distances between the pixel values. In RGB space, the differences are not observed as being equal. This means that the two pixels that are very close together in RGB space may appear to be very different colours, or very similar colours. To overcome this, the pixels are converted into L*a*b* space, which is more perceptually uniform, so that the perceived difference between pixels is relatively consistent throughout the colour space. This process is carried out on the image once it has been de-skewed, and preferably once lighting variation across the card has been eliminated (i.e. it operates on calibrated colours from the image).

An iterative process is used to determine how many clusters are present in the image portion representing the unknown sample and what the average colour is in each cluster The first iteration is the simplest because it is assumed that there is only one cluster of pixels in the sample. This means that the k-means algorithm would return a cluster containing all of the pixels. The average L*a*b* value of the pixels in the image is taken, and then the number of pixels within a certain distance of this average is calculated. If the number of pixels found is above a threshold, then it is assumed that there is only one colour in the image, however if the number of pixels is below the threshold, then the k-means algorithm is run on the image, attempting to group the pixels into two clusters. The average L*a*b* value of each cluster is calculated, and the number of pixels present within a certain distance of this pixel value is counted. Two calculations are carried out to check if this is significant—the first checks that the majority of the pixels in that cluster are within a set distance (i.e. that the mean is a good representation of that cluster), and this cluster is ignored if not enough pixels are within a set distance. The second calculation is that the number of pixels within a set distance of the mean of all valid clusters must be higher than a threshold (i.e. to check that enough pixels have been observed to have confidence that the dominant colours have been identified). If the number of counted pixels is lower than this threshold, then the k-means algorithm is run again but tries to group the pixels into three clusters instead of two, and the analysis is repeated.

Figure 8:
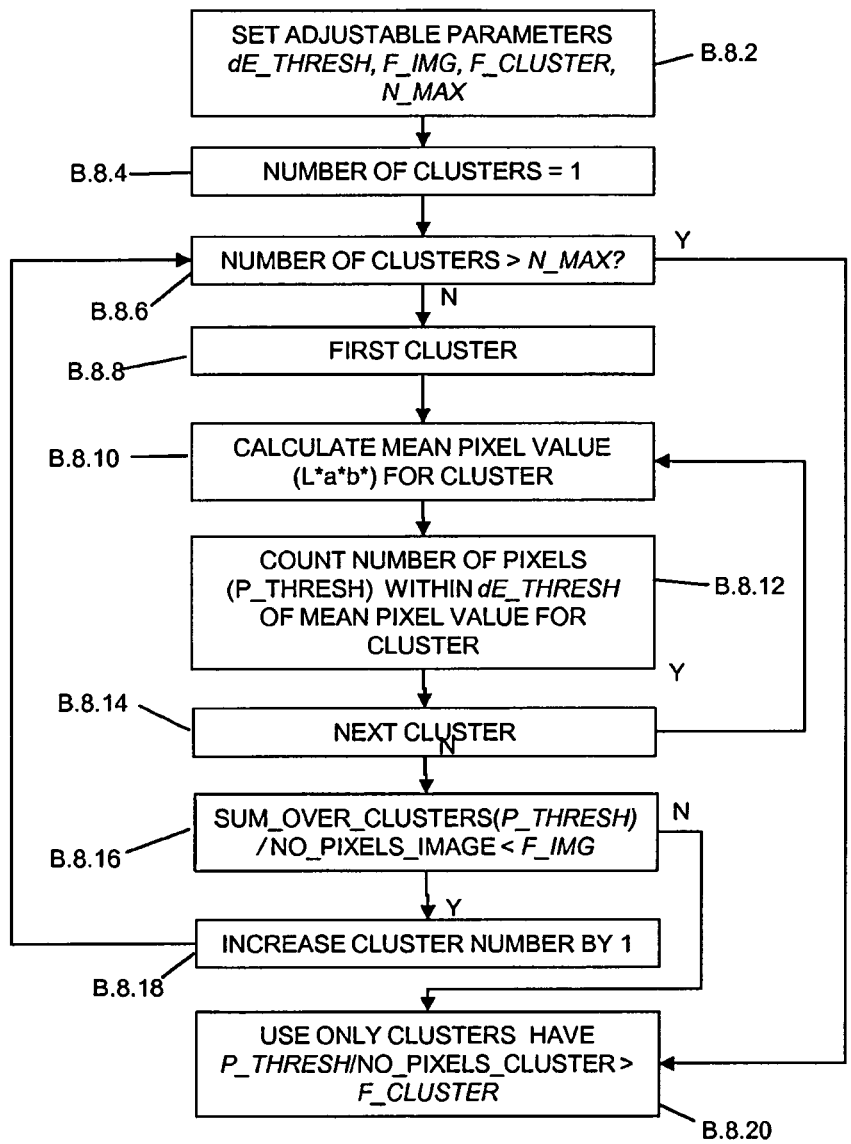
FIG. 8 is a flow diagram illustrating a clustering process used in an embodiment of the invention.

The following algorithm is used to find clusters, and this is shown in more detail in FIG. 8. The algorithm has several adjustable parameters:

Max delta-E radius (dE_thresh)
Required fraction of image (F_img)
Minimum fraction in cluster (F_cluster)
Max clusters to attempt (N_max)

and these are set for a particular implementation at block 8.2. Experimentation will indicate suitable values for the adjustable parameters The algorithm is as follows:
1. Start with 1 cluster (i.e. all the pixels in the sample) (block 8.4).
2. If the number of clusters is greater than N_max, go to step 5 (block 8.6)
3. Calculate the following statistics for each cluster (block 8.8)
   a. Mean pixel value (L*a*b*) (block 8.10)
   b. Number of pixels within dE_thresh of mean pixel value (P_thresh) (block 8.12)
4. If Sum(P_thresh)/(Number of pixels in image) is less than F_img (block 8.14), increase the number of clusters by 1 and go to step 2 (block 8.16).
5. Filter the clusters to include only those that have P_thresh/(number of pixels in cluster)>F_cluster (block 8.20).

Whilst within the above we refer to colour values in Lab space, the algorithm may also be run using XYZ values, as the two sets of colour data are mathematically related.

FIGS. 9 and 10 illustrate the operation of the algorithm graphically. In FIG. 9(*a*) a cluster 92 is identified, but the cluster fails the density threshold test as too high a percentage of pixels are outside the dE_thresh distance from the mean of the cluster. In FIG. 9(*b*) an attempt is made to cluster the distribution into two clusters, but cluster 94 is invalid as insufficient pixels are located within the radius of the cluster. In addition, the sample as a whole fails to pass the threshold for the entire sample image, as too many pixels are not in valid clusters. Therefore, the cluster number is increased to 3, and the clustering run again.

FIG. 10 illustrates the same distribution as in FIG. 9(*b*), but with three clusters. In part (a) of FIG. 10, the number of pixels within a distance of the mean is not high enough to pass using two clusters in the k-means algorithm, so the analysis is re-run using three clusters. Then the number of pixels within the fixed distance is high enough so the three colours found in the image, are the means of each cluster of pixels. In this case, clusters 1010, 1020, and 1030 can be identified, that each meet the threshold tests applied.

Various modifications may be made to the above described embodiments to provide further embodiments. For example, in each of the second to fifth embodiments they are each described as being based on the first embodiment. In the first embodiment the image is transmitted, via a telecommunications network to a back-end server for processing. In variants of the first to fifth embodiments, however, this need not be the case. Instead, a program may be made available for download onto a user's computer or mobile telephone that is able to perform the processing operations described. In this way, the user computer or telephone can calculate the colour of the unknown sample from the taken image, and optionally suggest paint colour matches, without any image data having to be sent over a network.

Additionally, in the above described embodiments we describe that the image that is taken contains both the card 24 and the unknown sample. However, this is not essential. In other embodiments two separate images may be provided spaced in time. A first image may be of the card 24 and this is used to find the calibration coefficients for the user imaging device. A separate image may then contain the unknown sample, the calibration coefficients found from the first image then applied to the RGB values of the unknown sample in the second image. However, this arrangement is less preferable than the above described arrangement, as for accuracy the lighting conditions of the first and second images need to kept substantially identical. However, this hurdle is removed if a single image containing both the calibration card 24 and the sample is taken.

Various further modifications, whether by way of addition, deletion, or substitution will be apparent to the intended reader, being a person skilled in the art, to provide further examples, any and all of which are intended to fall within the appended claims.

The invention claimed is:

1. A method, comprising:
receiving first image data relating to an unknown colour sample, colorimetry data for which is to be determined;
receiving second image data relating to a plurality of known calibration colour samples, colorimetry data for which are already known;
determining a plurality of colour calibration characteristics relating colour measurements of the known calibration colour samples from the second image data to the corresponding known colorimetry data of the calibration colour samples;
calculating colorimetry data of the unknown colour sample in dependence on colour measurements thereof from the first image data and the determined colour calibration characteristics; and
matching the determined colorimetry data of the unknown colour sample to a colour palette of paint colours to identify a matching paint colour, and providing information relating to the matching paint colour to a user;
wherein the method is performed by an apparatus comprising at least one processor, and at least one memory including a computer program code, the at least one memory and the computer program code configured to, with the at least one processor, cause the apparatus to perform the method.

2. The method according to claim 1, wherein the first image data and second image data are received from a remote user via a telecommunications network, and the information relating to the matching paint colour is provided to the user via the telecommunications network.

3. The method according to claim 2, wherein the first image data and second image data are received as any of: i) an email message; ii) an MMS message; and/or iii) as image data in a web page; and wherein the information relating to the matching paint colour is provided as any of i) an email message; ii) an MMS message; iii) an SMS message and/or iv) data in a web page.

4. The method according to claim 1, wherein the first image data and the second image data are produced by the user using an image capture device; wherein the image capture device is selected from: i) a digital camera; ii) a camera equipped mobile telephone; and iii) a digital camcorder.

5. The method according to claim 1, wherein the determined colorimetry data and/or the known colorimetry data are XYZ tri-stimulus values.

6. The method according to claim 1, and further comprising determining complementary colours to the matching colour, and providing information relating to the determined complementary colours to the user.

7. The method according to claim 1, and further comprising orienting at least the second image data into a known orientation to allow for recognition of the known calibration colour samples therein.

8. The method according to claim 7, wherein the orienting comprises performing edge detection to identify the location of the set of known calibration colour samples in the second image data.

9. The method according to claim 7, wherein the orienting further comprises identifying a plurality of pre-determined points relating to the set of known calibration colour samples in the second image data and applying a perspective transformation to the second image data in dependence on the location of the identified points to de-skew the image of the set of known calibration colour samples.

10. The method according to claim 7, wherein the orienting further comprises identifying pre-determined rotational orientation markings relating to the set of known calibration colour samples in the second image data; and rotating the second image data in dependence on the location of the identified rotational orientation marks such that the known calibration colour samples are placed into a known position in the second image data.

11. The method according to claim 1, wherein the determining of the colour calibration characteristics comprises compensating for brightness differences across the set of known calibration colour samples.

12. The method according to claim 11, wherein the compensating comprises determining a first set of one or more functions having a first set of calibration coefficients, the one or more functions relating measured colours of the known calibration colour samples from the second image data to the known colorimetry data of the calibration colour samples and the known position of each known sample in the image; and analysing the determined functions to find a second set of functions having a second set of calibration coefficients, wherein the first and second sets of functions and calibration coefficients are used in calculating the colorimetry data of the unknown colour sample.

13. The method according to claim 12, wherein the compensating further comprises, prior to the determination of the first set of functions, determining a pre-cursor set of functions having a pre-cursor set of calibration coefficients that relate measured colours of the known calibration colour samples from the second image data to the known colorimetry data of the calibration colour samples without taking into account position of the known colour samples, wherein the pre-cursor set of calibration coefficients are used as part of the first set of calibration coefficients in the determination of the first set of one or more functions.

14. The method according to claim 1, wherein the colour calibration characteristics are determined using N known calibration colour samples, wherein N is less than the total number of known calibration colour samples across the whole colour space.

15. The method according to claim 14, wherein the N known calibration colour samples are those N samples that are the closest in colour space to an estimated colour of the unknown colour sample.

16. The method according to claim 15, wherein the estimated colour is obtained by determining a first set of calibration characteristics using all the available known calibration colour samples, and calculating the estimated colour using the first set of calibration characteristics.

17. The method according to claim 14, wherein the N known calibration colour samples are those N samples used within a confined colour space that the second image data is known to represent.

18. The method according to claim 14, wherein the N known calibration colour samples are those N samples that have measured colour values from the second image data that are most similar to the measured colour value of the unknown sample from the first image data.

19. The method according to claim 14, wherein N is in a range of substantially 5 to substantially 250.

20. The method according to claim 1, wherein the calculating comprises:
   applying a clustering algorithm to pixel values of pixels representing the unknown colour sample in the first image to determine the number of colours in the sample image; and
   returning a colour for each identified cluster.

21. The method according to claim 20, wherein the pixel values are first calibrated using the colour calibration characteristics.

22. The method according to claim 20, wherein the clustering algorithm in use operates as follows:
   i) calculate the mean value of pixels in a cluster;
   ii) determine the number of pixels within a predetermined threshold distance of the mean value;
   iii) increase the number of clusters if the determined number of pixels is less than a predetermined fraction of the number of pixels in the first image data relating to the unknown sample.

23. The method according to claim 22, and further comprising filtering clusters to remove those clusters from consideration that do not contain a threshold number of pixels within a second threshold distance of the mean of the cluster.

24. A non-transitory computer readable medium storing a computer program or at least one of a suite of computer programs so arranged such that when run on a computer system it/they cause the computer system to perform the method of claim 1.

25. An apparatus, comprising:
   at least one processor; and
   at least one memory including a computer program code;
   the at least one memory and the computer program code configured to, with the at least one processor, cause the apparatus to perform at least the following:
   i) receive first image data relating to an unknown colour sample, colorimetry data for which is to be determined, and second image data relating to a plurality of known calibration colour samples, colorimetry data for which are already known;
   ii) determine a plurality of colour calibration characteristics relating colour measurements of the known calibration colour samples from the second image data to the corresponding known colorimetry data of the calibration colour samples;
   iii) calculate colorimetry data of the unknown colour sample in dependence on colour measurements thereof from the first image data and the determined colour calibration characteristics;
   iv) match the determined colorimetry data of the unknown colour sample to a colour palette of paint colours to identify a matching paint colour, and
   v) provide information relating to the matching paint colour to a user.

26. The apparatus according to claim 25, wherein the first image data and second image data are received from a remote user via a telecommunications network, and the information relating to the matching paint colour is provided to the user via the telecommunications network.

27. The apparatus according to claim 26, wherein the first image data and second image data are received as any of: i) an email message; ii) an MMS message; and/or iii) as image data in a web page; and wherein the information relating to the matching paint colour is provided as any of i) an email message; ii) an MMS message; iii) an SMS message and/or iv) data in a web page.

28. The apparatus according to claim 25, wherein the first image data and the second image data is produced by the user using an image capture device; wherein the image capture device is preferably any of: i) a digital camera; ii) a camera equipped mobile telephone; and/or iii) a digital camcorder.

29. The apparatus according to claim 25, wherein the determined colorimetry data and/or the known colorimetry data are XYZ tri-stimulus values.

30. The apparatus according to claim 25, wherein the at least one memory and the computer program code are configured to, with the at least one processor, cause the apparatus to further determine complementary colours to the matching colour, and providing information relating to the determined complementary colours to the user.

31. The apparatus according to claim 25, wherein the at least one memory and the computer program code are configured to, with the at least one processor, cause the apparatus to further orient at least the second image data into a known orientation to allow for recognition of the known calibration colour samples therein.

32. The apparatus according to claim 31, wherein the orienting comprises performing edge detection to identify the location of the set of known calibration colour samples in the second image data.

33. The apparatus according to claim 31, wherein the orienting further comprises identifying a plurality of pre-determined points relating to the set of known calibration colour samples in the second image data and applying a perspective transformation to the second image data in dependence on the location of the identified points to de-skew the image of the set of known calibration colour samples.

34. The apparatus according to claim 31, wherein the orienting further comprises identifying pre-determined rotational orientation markings relating to the set of known calibration colour samples in the second image data; and rotating the second image data in dependence on the location of the identified rotational orientation marks such that the known calibration colour samples are placed into a known position in the second image data.

35. The apparatus according to claim 25, wherein the determining of the colour calibration characteristics comprises compensating for brightness differences across the set of known calibration colour samples.

36. The apparatus according to claim 35, wherein the compensating comprises determining a first set of one or more functions having a first set of calibration coefficients, the one or more functions relating measured colours of the known calibration colour samples from the second image data to the known colorimetry data of the calibration colour samples and the known position of each known sample in the image; and analysing the determined functions to find a second set of functions having a second set of calibration coefficients, wherein the first and second sets of functions and calibration coefficients are used in calculating the colorimetry data of the unknown colour sample.

37. The apparatus according to claim 36, wherein the compensating further comprises, prior to the determination of the first set of functions, determining a pre-cursor set of functions having a pre-cursor set of calibration coefficients that relate measured colours of the known calibration colour samples from the second image data to the known colorimetry data of the calibration colour samples without taking into account position of the known colour samples, wherein the pre-cursor set of calibration coefficients are used as part of the first set of calibration coefficients in the determination of the first set of one or more functions.

38. The apparatus according to claim 25, wherein the colour calibration characteristics are determined using N known calibration colour samples, wherein N is less than the total number of known calibration colour samples across the whole colour space.

39. The apparatus according to claim 38, wherein the N known calibration colour samples are those N samples that are the closest in colour space to an estimated colour of the unknown colour sample.

40. The apparatus according to claim 39, wherein the estimated colour is obtained by determining a first set of calibration characteristics using all the available known calibration colour samples, and calculating the estimated colour using the first set of calibration characteristics.

41. The apparatus according to claim 38, wherein the N known calibration colour samples are those N samples used within a confined colour space that the second image data is known to represent.

42. The apparatus according to claim 38, wherein the N known calibration colour samples are those N samples that have measured colour values from the second image data that are most similar to the measured colour value of the unknown sample from the first image data.

43. The apparatus according to claim 38, wherein N is in a range of substantially 5 to substantially 250.

44. The apparatus according to claim 25, wherein the calculating comprises:
  applying a clustering algorithm to pixel values of pixels representing the unknown colour sample in the first image to determine the number of colours in the sample image; and
  returning a colour for each identified cluster.

45. The apparatus according to claim 44, wherein the pixel values are first calibrated using the colour calibration characteristics.

46. The apparatus according to claim 44, wherein the clustering algorithm in use operates as follows:
  i) calculate the mean value of pixels in a cluster;
  ii) determine the number of pixels within a predetermined threshold distance of the mean value;
  iii) increase the number of clusters if the determined number of pixels is less than a predetermined fraction of the number of pixels in the first image data relating to the unknown sample.

47. The apparatus according to claim 46, and further comprising filtering clusters to remove those clusters from consideration that do not contain a threshold number of pixels within a second threshold distance of the mean of the cluster.

* * * * *